(12) United States Patent
Richard

(10) Patent No.: US 8,700,536 B2
(45) Date of Patent: *Apr. 15, 2014

(54) SYSTEM FOR MANAGING DIGITAL INTERACTIONS

(75) Inventor: Philippe Richard, Calgary (CA)

(73) Assignee: Smart Points Technology, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,713

(22) Filed: Apr. 2, 2012

(65) Prior Publication Data

US 2012/0221641 A1     Aug. 30, 2012

Related U.S. Application Data

(62) Division of application No. 12/189,135, filed on Aug. 8, 2008, now Pat. No. 8,170,957.

(60) Provisional application No. 60/963,930, filed on Aug. 8, 2007.

(51) Int. Cl.
*G06Q 20/00*     (2012.01)

(52) U.S. Cl.
USPC .................................. 705/76; 705/51; 726/1

(58) Field of Classification Search
USPC .................... 713/185, 200; 705/51
See application file for complete search history.

(56) References Cited

U.S. PATENT DOCUMENTS

| | | | | |
|---|---|---|---|---|
| 6,850,252 | B1 * | 2/2005 | Hoffberg | 715/716 |
| 6,983,371 | B1 * | 1/2006 | Hurtado et al. | 713/189 |
| 8,170,957 | B2 * | 5/2012 | Richard | 705/76 |
| 2002/0112171 | A1 * | 8/2002 | Ginter et al. | 713/185 |
| 2006/0274727 | A1 * | 12/2006 | Musayev et al. | 370/352 |

* cited by examiner

*Primary Examiner* — Tsan-Yu J Huang
(74) *Attorney, Agent, or Firm* — Waters & Associates, PLC

(57) ABSTRACT

A system for managing digital interactions comprising an identity module for creating an identity, wherein the identity includes a unique identifier associated with a first party and a plurality of proposed terms for a relationship with a second party; and a relationship module, in communication with the identity module, for receiving and evaluating the plurality of proposed terms, including accepting or rejecting the plurality of proposed terms and, if accepted, for allowing the first party to communicate with the second party in accordance with the plurality of proposed terms.

34 Claims, 22 Drawing Sheets

SYSTEM FOR MANAGING DIGITAL INTERACTIONS

CROSS REFERENCE TO RELATED APPLICATION

This application is a divisional of application Ser. No. 12/189,135, filed Aug. 8, 2008, now U.S. Pat. No. 8,170,957 which claims the benefit of U.S. Provisional Application No. 60/963,930, filed Aug. 8, 2007, both of which are incorporated by reference herein, in their entireties, for all purposes.

TECHNICAL FIELD

This invention relates generally to facilitating social interaction and, more particularly, to a system that provides structure for relationships between people and entities.

BACKGROUND INFORMATION

In the age of dumb terminals each user got a login ID and a password. That was used to connect to a mainframe and was mapped to specific permissions managed centrally. This was a pretty good arrangement since the user requested certain permissions, got those permissions granted, and eventually was able to access some mainframe resources. There were virtually no side effects.

As the client/server architectures developed, the same concept of a login ID and password continued but now there were many networks, each with their own policies for issuing a login ID and password. Each user was still required to request certain permissions, got those permissions granted, and gained access. But now this process had to be repeated for many systems and remembering the user ID and password for each system became onerous, never mind remembering the specific permissions the user had on each system.

At this point, various IDentity Management (IDM) products started to emerge to make the process of creating IDs and passwords simpler, and to provide more central management of permissions. This all seemed like a good thing, and as long as the scope of the IDM remained inside a single corporation, it offered significant advantages with few undesirable side effects for the user. Most corporations offered a means of changing and reviewing permissions and although the process was relatively cumbersome it was sufficient in the context of closed corporate environments.

As the Internet emerged the user's connected world expanded by leaps and bounds. Each user now had many identities: in their role at work, as a bank customer, as a parent, as a student, and so on. Unfortunately the management of identifiers and permissions did not evolve in the same way. The process of issuing login IDs and passwords simply migrated to the individual domains on the Internet (AOL, Yahoo, MSN, etc.) and the concept of identity become a unidirectional process—the user gives away information and gets back an identity defined entirely by a third party. This led to the current state of affairs where the user has essentially abdicated her right to privacy and third parties can aggregate the user's personal information at will and without her consent.

What is needed is a system by which the user is free to negotiate rights and privacy in a way that will consistently work for all networked interactions.

SUMMARY OF THE INVENTION

The present invention embodies a concept of identity to match the new world of the Internet. The invention puts the user back in the driver's seat with the process of accessing resources centered around the negotiation of mutually agreeable terms that are private and unique to each relationship. The identifier of old becomes a negotiated construct that both sides of a relationship uniquely recognize, yet is completely opaque to any third party. The user now sits at one end of every relationship she establishes, and reviewing the terms (or accessing and updating information shared under those terms) becomes as simple as opening her electronic address book.

A Relationship Nexus Agent (RNA) extends this paradigm to the logical complementary step: relationships exist for the purpose of exchanging information. The exchange of information is rarely based on a static set of terms and conditions. Rather, these exchanges evolve over time and the terms change along with them. This implies that all information is really an integral part of dynamic processes that define the terms of evolving conversations taking place in the context of complex relationships. RNA architectures according to the present invention make these complex interactions explicit, manageable, and secure.

On aspect of managed digital interactions is mutuality. The terms of each relationship are mutually agreed upon and can be negotiated. Privacy is included as a part of those terms.

Another aspect of managed digital interactions is interconnectedness. This accomplished by providing interchanges that work both reciprocally and globally. This tends to increase knowledge since knowledge is largely a result of connected data.

Another aspect of managed digital interactions is that conversations are allowed to evolve over time, while the information conveyed in the conversation remains defined by the terms of the relationship.

Another aspect of managed digital interactions is active authorization. Authorization is an active event, but need not remain fixed as a "snap shot" of what was authorized in the past. The rules of interaction are permitted to change over time and to change based on context.

To effect results according to the present invention, there are three touchstone concepts to be followed. First, negotiated secure communication channels are established. Second, dynamic collaboration networks are established. Third, collaborative agreements are dynamically resolved.

These and other features and advantages of this invention will become more apparent to those skilled in the art from the detailed description of a preferred embodiment. The drawings that accompany the detailed description are described below.

DETAILED DESCRIPTION

Figure 1:
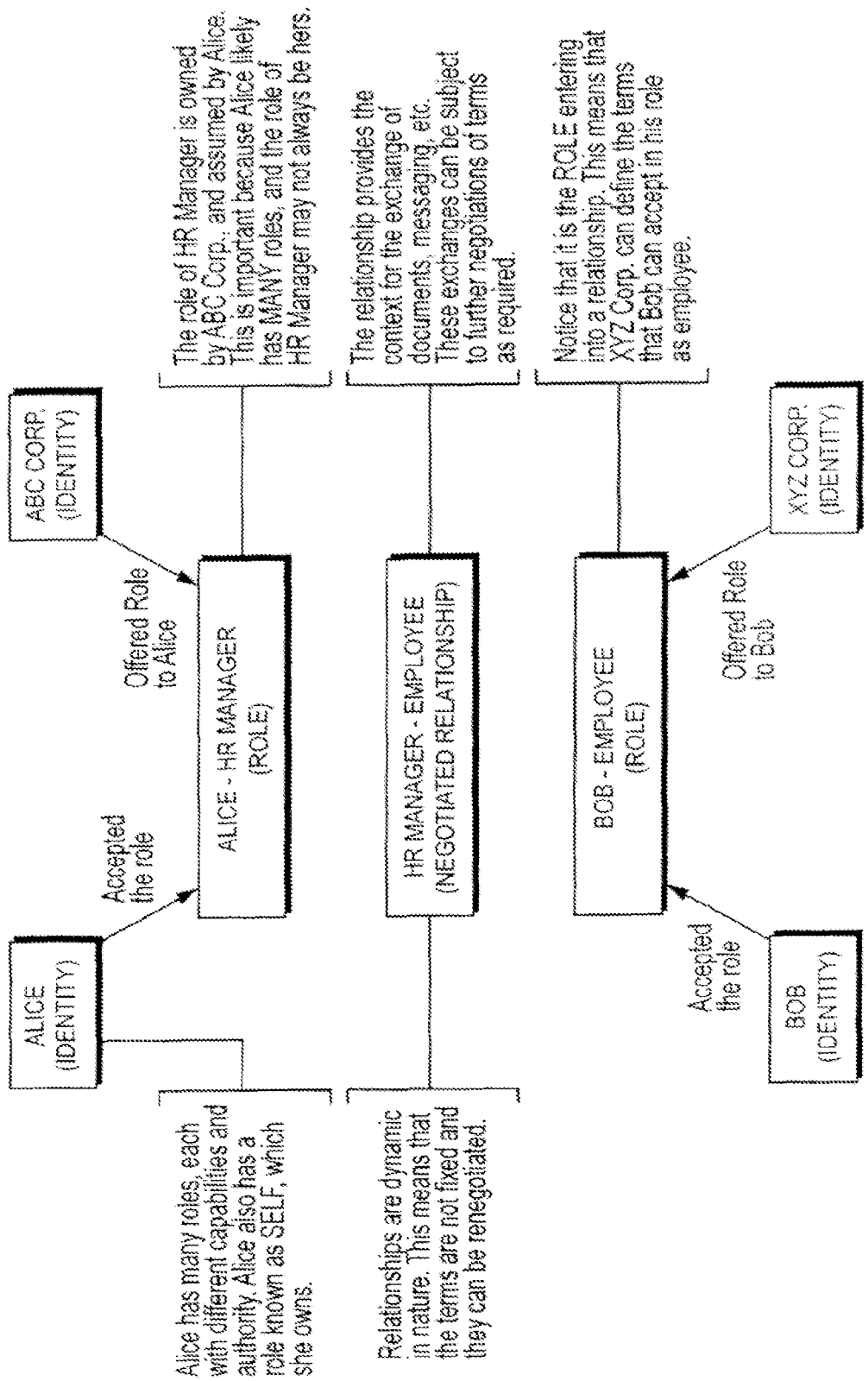
FIG. 1 is a block diagram illustrating an ontology according to an exemplary embodiment of the invention.

In the following discussion of illustrative embodiments, the term "ontology" is used to refer to relationships between people and machines that control digital interactions.

In any business transaction, access to resources, such as applications and information systems, must be controlled. This control is enforced by determining whether or not a subject, described by a set of attributes including an identity, is authorized to access the requested resource, then granting them permission. Permissions are also controlled by contractual agreements and context (for instance, access to certain documents might be restricted to specified secure locations).

As businesses open their infrastructure and extend their networks and applications to include customers, partners and suppliers, a fundamental disconnect is exposed: there is no standardized way today to "trust" or broker identities belonging to partners and other external users. Federated identity solutions are emerging, but they are proving difficult and expensive to implement when organizations wish to extend their network to a large number of small partners who come and go frequently.

At the heart of the problem is the issue of trust: it is simply not realistic to expect organizations to establish all possible trust relationships in advance. Needed is a way to establish just the right amount of trust for just the required amount of time and no more. Setting up and tearing down these relationships must be as easy as sending an email message, yet it must also offer bullet-proof security and accountability.

Key management uses some of the same techniques used in traditional Public Key Infrastructures (namely, embodiment of the present invention does not attempt to reinvent proven cryptography techniques). However the process of managing keys with an ontology of the present invention is quite different.

Key management is the hardest part of cryptography. Generally there are two classes of keys, short-term keys and long-term keys. Short-term session keys (sometimes called ephemeral keys) are usually generated automatically and invisibly. They are used for one message or session and discarded. Long-term keys are generated explicitly by the user. They are used for authentication (including access control, integrity, and non-repudiation) and confidentiality (encryption). Long-term keys are also used to establish session keys and to protect stored data.

Embodiments of the present invention are designed to deal with both short and long term keys completely transparently with a minimal amount of peripheral infrastructure required. Authentication and verification are generally required only during the initial provisioning process, thus dramatically reducing the number of times a third party needs to be involved in transactions.

Some embodiments rely on a simple protocol extension to the Simple Mail Transfer Protocol (SMTP) and Extensible Messaging and Presence Protocol (XMPP) protocols for most of the provisioning and authorization functions, allowing participant messaging servers to handle most of the transactions that typically cause scalability issues with public key infrastructures.

Embodiments of the present invention provide a flexible key certification framework. There are many scenarios where no third party is required in order to certify a key (small business scenarios where the participants are part of an established relationship for instance). In one embodiment, the present invention effectively removes the notion of a public key. Instead, the ontology embeds a unique key pair for every relationship, which results in a number of benefits. Obtaining someone else's public key is as simple as sending an email to propose a relationship. There is no public key involved—proposing a relationship automatically creates a new public key specifically for this relationship.

Embodiments of the present invention provide built-in confidentiality and authentication. For confidentiality (i.e., sharing the information only with the intended party), the ontology embeds crypto material that can only be read by the intended recipient. The mechanism is extensible to address evolving security requirements. Regarding authentication (i.e., sharing the information with the intended party) the ontology can take advantage of out-of-band authentication secrets and they can also use identity verification authorities such as Equifax.

Embodiment of the present invention may be used to design an ontology that can be managed like email addresses. They can be stored in address books, active directory, or any other suitable repository. Since there are no public keys there is no need for a complex revocation mechanism. An ontology may be revoked by deleting it and possibly issuing a new one.

Embodiments of the present invention may be configured to address the effects of compromised information. With respect to authentication, signed documents are rendered invalid unless time-stamped. To address this situation, authentication may be renewed (resulting in a new ontology) and the documents may be rekeyed by mutual agreement. With respect to confidentiality, all data encrypted with a compromised ontology is compromised. However the effect is strictly limited to the affected relationship, making it reasonably simple to rekey the affected material.

An ontology is a framework that defines the creation and management of relationship-based identities in terms of explicit mutually negotiated/managed agreements. Identities are initially expressed in the form of a URI or an email address containing a unique encrypted identifier along with a summary of the proposed terms and a digital signature—the result is called an ontology. An ontology can be used just like a regular email address. In fact, the default means of establishing an ontology-based relationship is to simply exchange e-mails. However, embodiments of the present invention are not limited to this method of exchange. The process of establishing an ontology can occur over any suitable transport mechanism.

An ontology is used only to establish the initial agreement to enter into a relationship. The actual terms of the relationship are negotiated via workflow based agents called NetRNA (Network Relationship Network Agents). The NetRNA is the embodiment and enforcement of the terms. Identity has no practical meaning unless it is defined in the context of a relationship.

EXAMPLES

Figure 2:
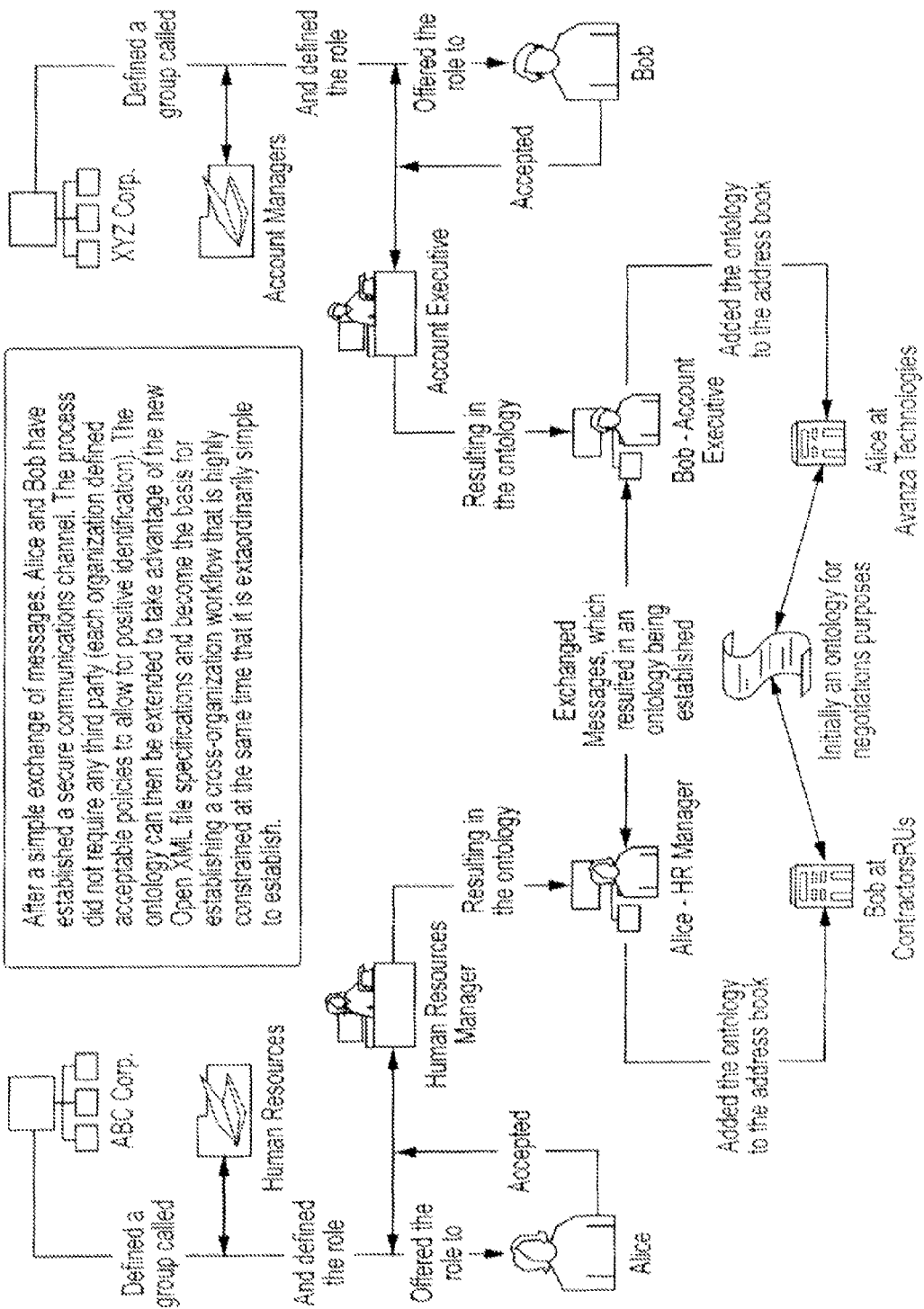
FIG. 2 is a schematic diagram that illustrates exemplary relationships for a user.

FIG. 1 illustrates an exemplary ontology. Users Alice and Bob each have an identity and a role in relation to their respective companies. The users also have a negotiated relationship with one another in the context of their corporate roles. Referring to FIG. 2, embodiments of the present invention may be used to create and manage digital interactions for a manager of human resources in the context of her relationship with her employer. If Alice is the human resources manager at ABC Corp., then her role in the context of her relationship with ABC Corp. may include hiring employees, managing benefit plans, and entering into certain agreements with other companies, such as hiring a subcontractor (e.g., Bob). Embodiments of the present invention may be used to define an identity (e.g., Alice—HR Manager for ABC Corp.) that may be assigned to and accepted by Alice. This identity may then be used to manage and enforce the terms of Alice's relationship with ABC Corp. in her role as human resources manager.

Embodiments of the present invention allow Alice access to resources centered around the negotiation of mutually agreeable terms that are private and unique to each relationship. The identifier of old becomes a negotiated construct that both sides of a relationship uniquely recognize, yet is completely opaque to any third party. Alice now sits at one end of every relationship she establishes, and reviewing the terms (or accessing and updating information shared under those terms) becomes as simple as opening her electronic address book.

Relationships exist for the purpose of exchanging information. Further, the exchange of information is rarely based on a static set of terms and conditions—rather, these exchanges evolve over time and the terms change along with it. For instance a collaboration to write a book has many phases that involve different people at various points in the process. This implies that all information is really an integral part of dynamic processes that define the terms of evolving conversations taking place in the context of complex relationships. The Relationship Nexus Agent (RNA) architecture of the present invention is designed to make these complex interactions explicit, manageable, and secure.

The Open XML specifications for Office 2007 documents and the recent release of the Windows Workflow Foundation (WWF) and Windows Communication Foundation (WCF) provide a further enhancement for embodiments of the present invention. The Open XML format defines an internal architecture for documents consisting of parts and relationships. According to an embodiment, an ontology expresses the terms of relationships. By extending the definition of relationships in Open XML documents to include an ontology, as described herein, it becomes possible to create documents that express complex business agreements containing multiple interrelated relationships. Documents created in this manner can embed the terms governing access to each part of a document, and various parts could express very specific rules and permissions. For instance, a contract to retain a consultant could embed the specific permissions that will establish access to printers, shared resources, calendar views, etc. When combined with WWF and WCF it becomes possible to create documents that express dynamic relationships based on rich workflows that can be safely distributed across organizations.

Figure 3:
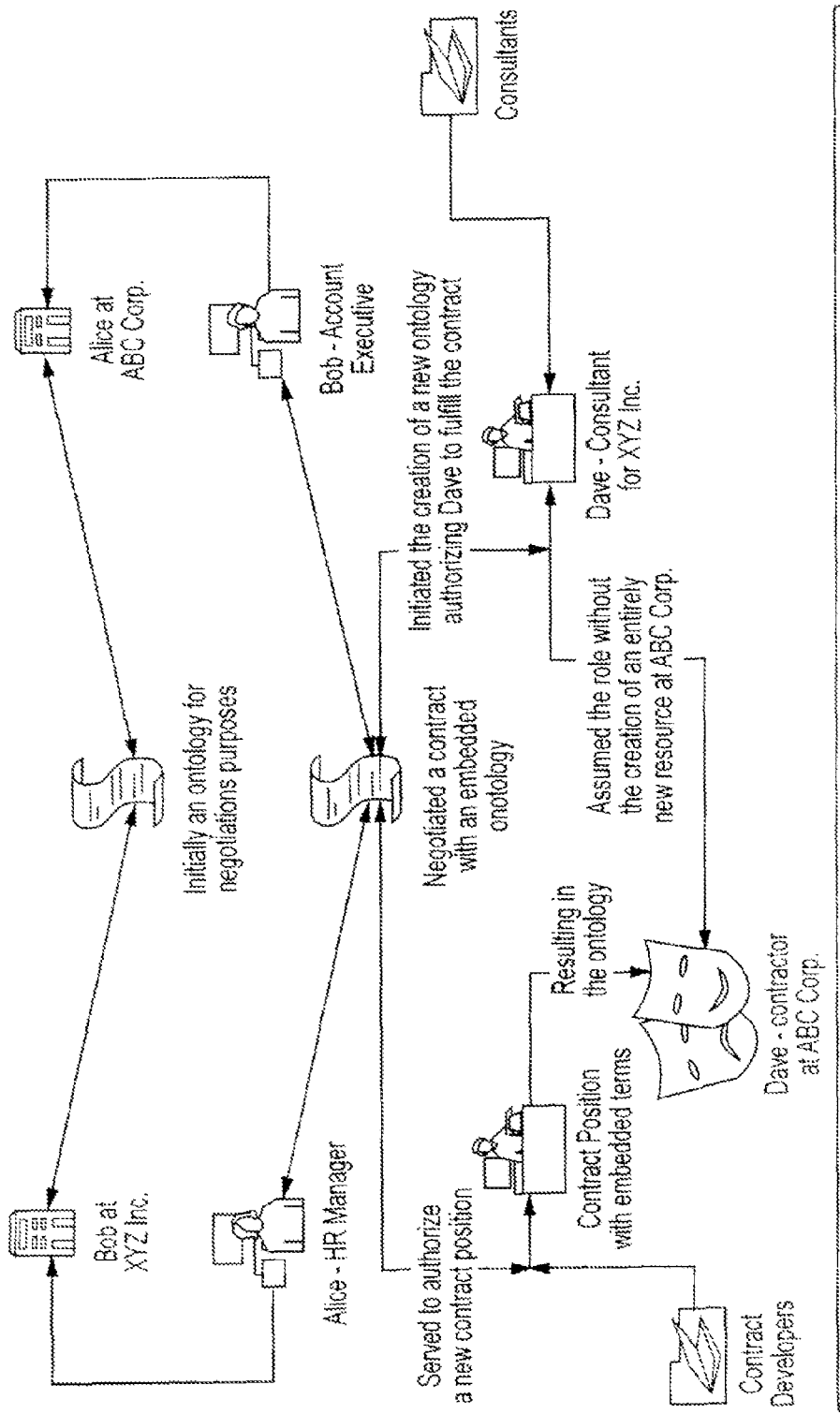
FIG. 3 is a schematic diagram that illustrates two entities' entry into a contractual agreement.

FIG. 3 is a schematic diagram that illustrates, according to an embodiment, a scenario where ABC Corp. has decided to enter into a contractual agreement with XYZ Inc. for a temporary position to develop a new software application. In FIG. 3, we assume that Alice and Bob had already established an initial relationship defined by an ontology. A new ontology is created during the negotiation process to handle the requirements of the negotiation (confidentiality, auditable, etc.) and once an agreement is made an ontology is created to represent the final terms. A typical scenario would involve negotiating an agreement for services then provisioning a new user within the ABC Corp. environment to allow XYZ Inc.'s contractor access to the required resources within ABC Corp. This position would require the creation of a new identity. Any relationship with the contracting organization is disconnected from the process and if this is repeated with many partners over a long period of time the result is the kind of disarray commonly found in most organizations today. Federated identity solutions must manage the complete user lifecycle, within and across enterprises. This means user and account creation, account linking, authentication, access control, and account termination. Once identity federation is contemplated, it is necessary to evaluate what will be done with a federation, who is going to participate, how it will be managed, and what types of risks must be assumed by federation participants.

Embodiments of the present invention eliminate this problem by extending the natural business process of defining an agreement such that the resources and permissions required to fulfill the process are allocated and permanently linked to the final artifacts of the negotiation. In fact, the entire life cycle of the resources and permissions associated with a contract are tied to it and are therefore self-describing and largely self-managing.

Figure 4:
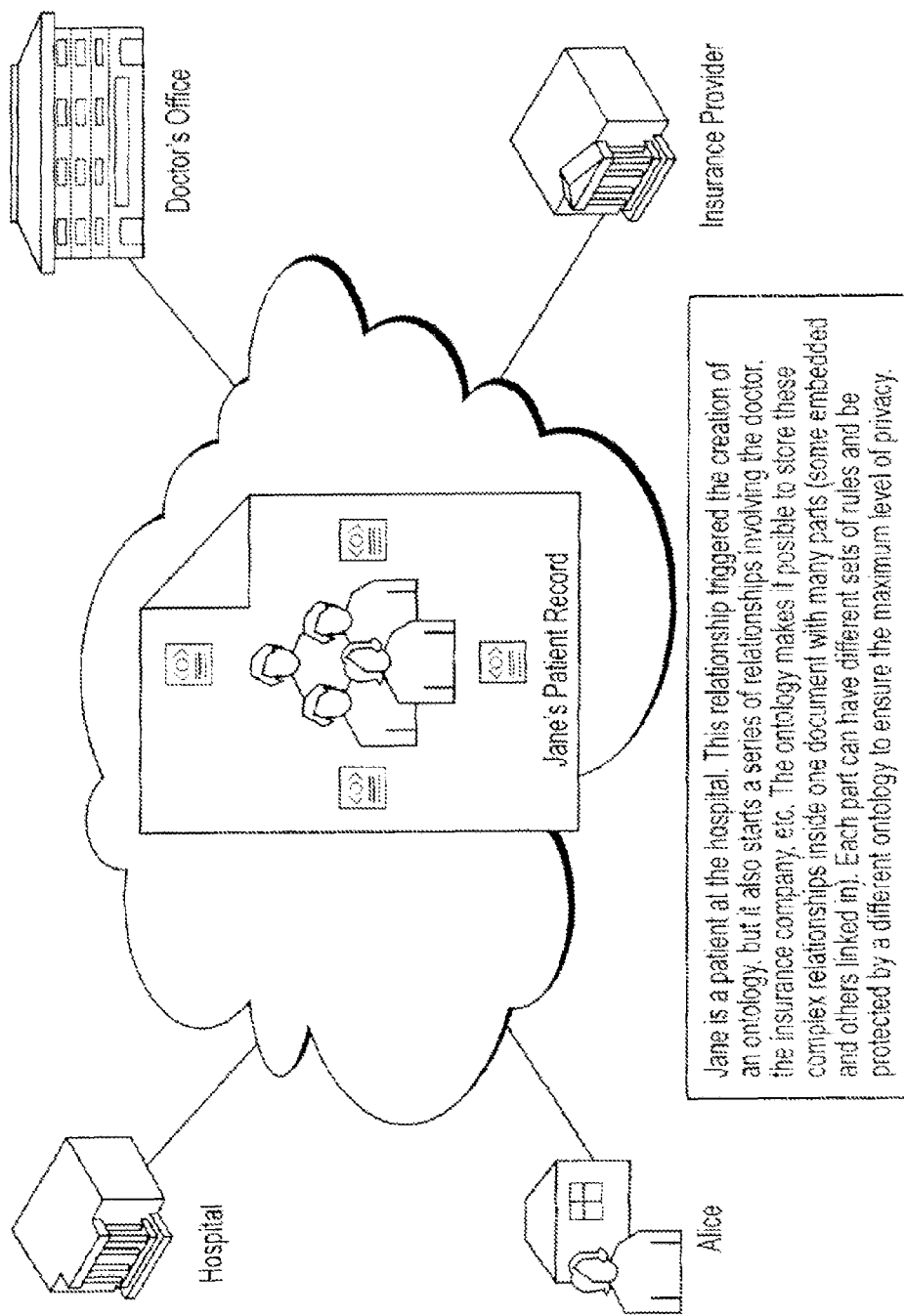
FIG. 4 is a schematic diagram that illustrates application of an embodiment to the health care industry where a user is a patient at a hospital.
Figure 5A:
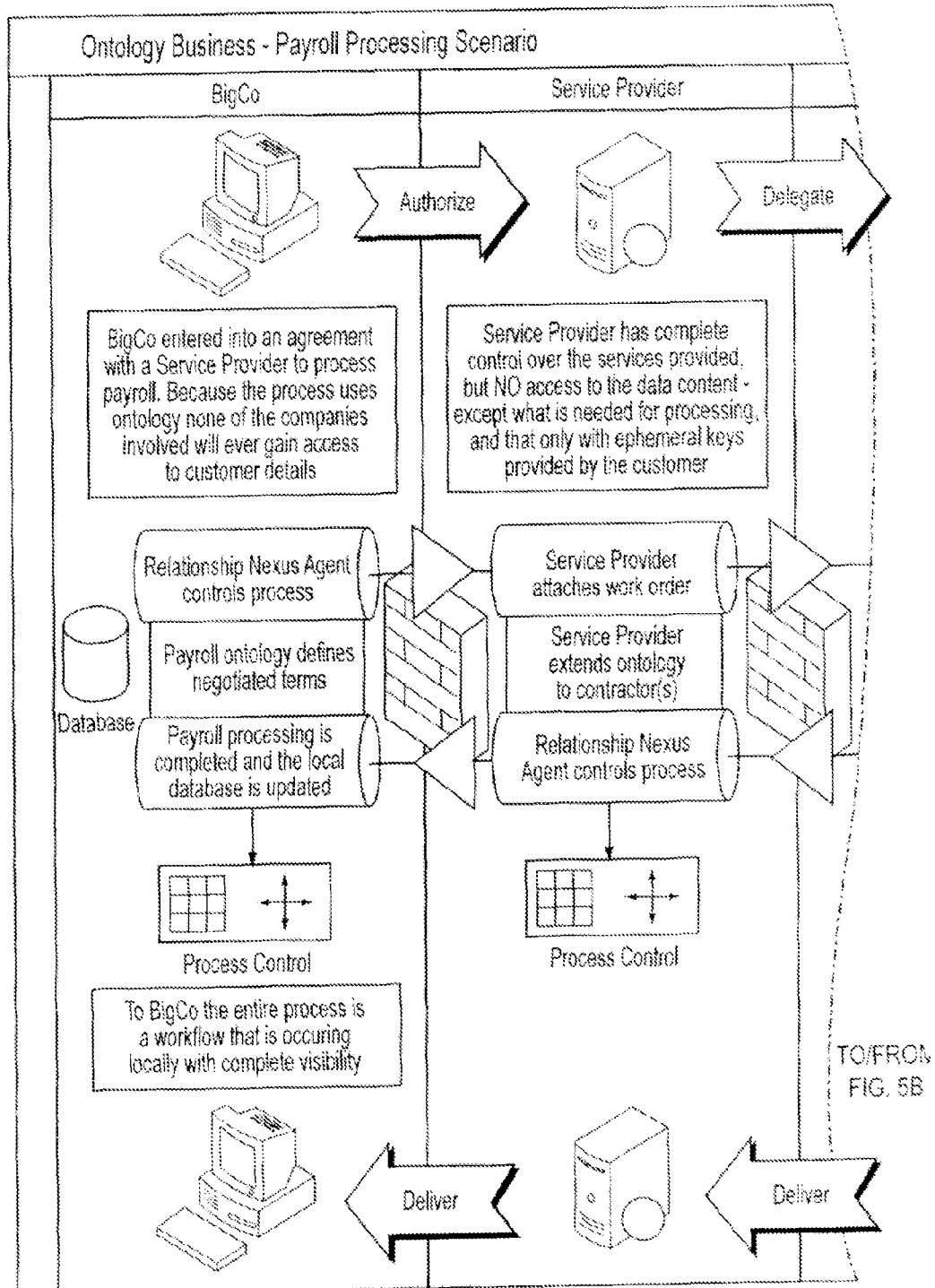
FIGS. 5-11 disclose various steps in negotiating an ontology under various contexts.
Figure 5B:
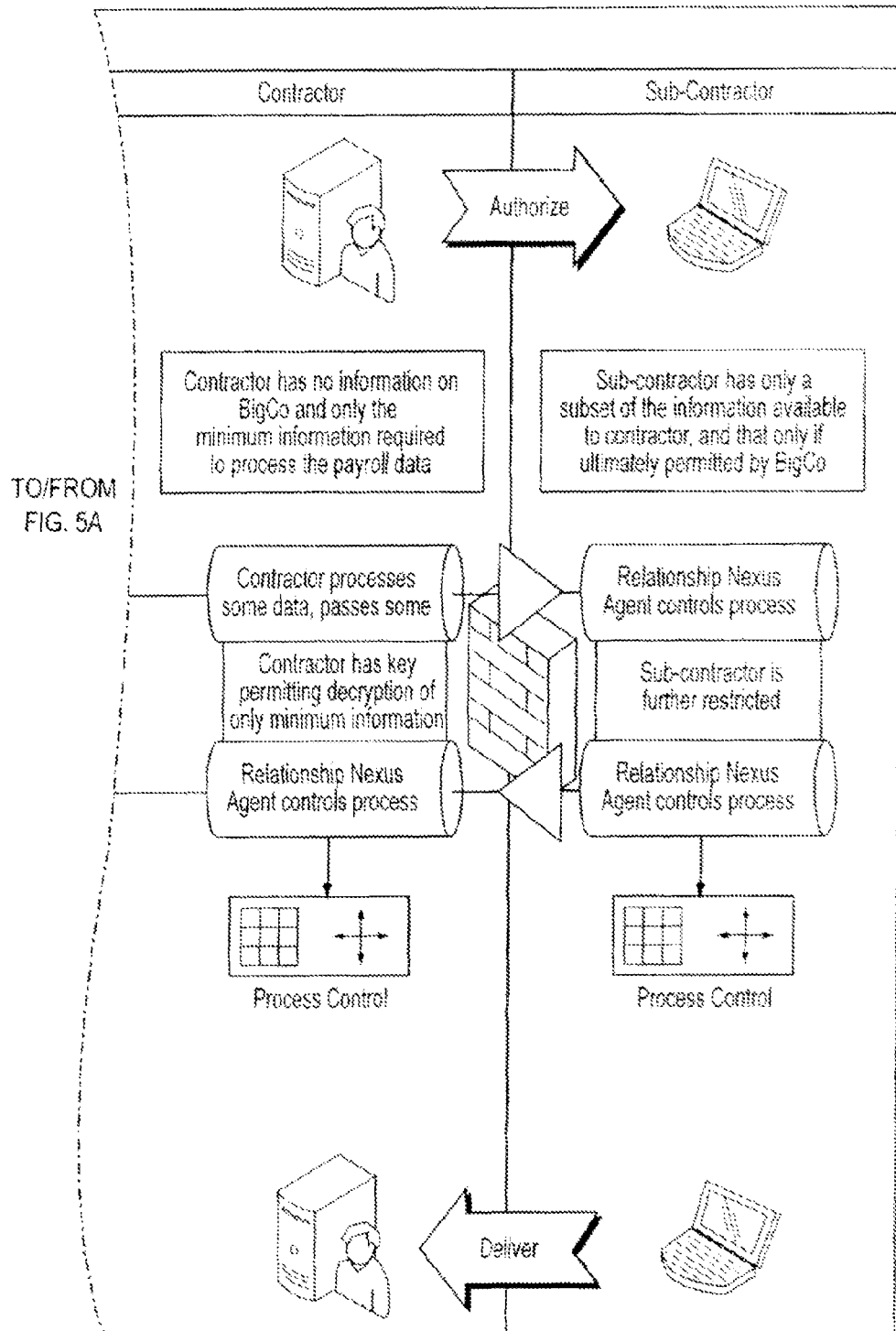
Figure 6A:
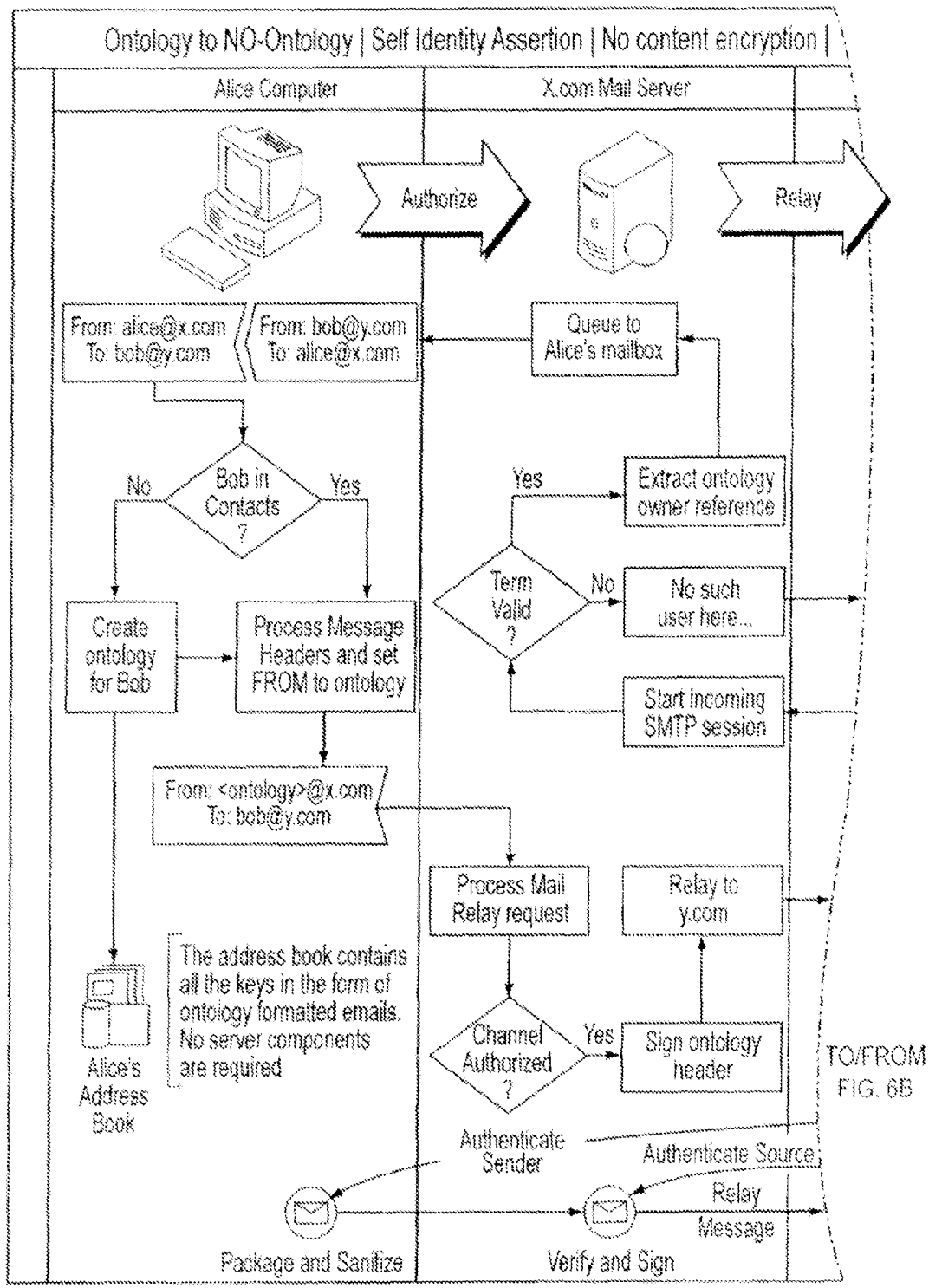
Figure 6B:
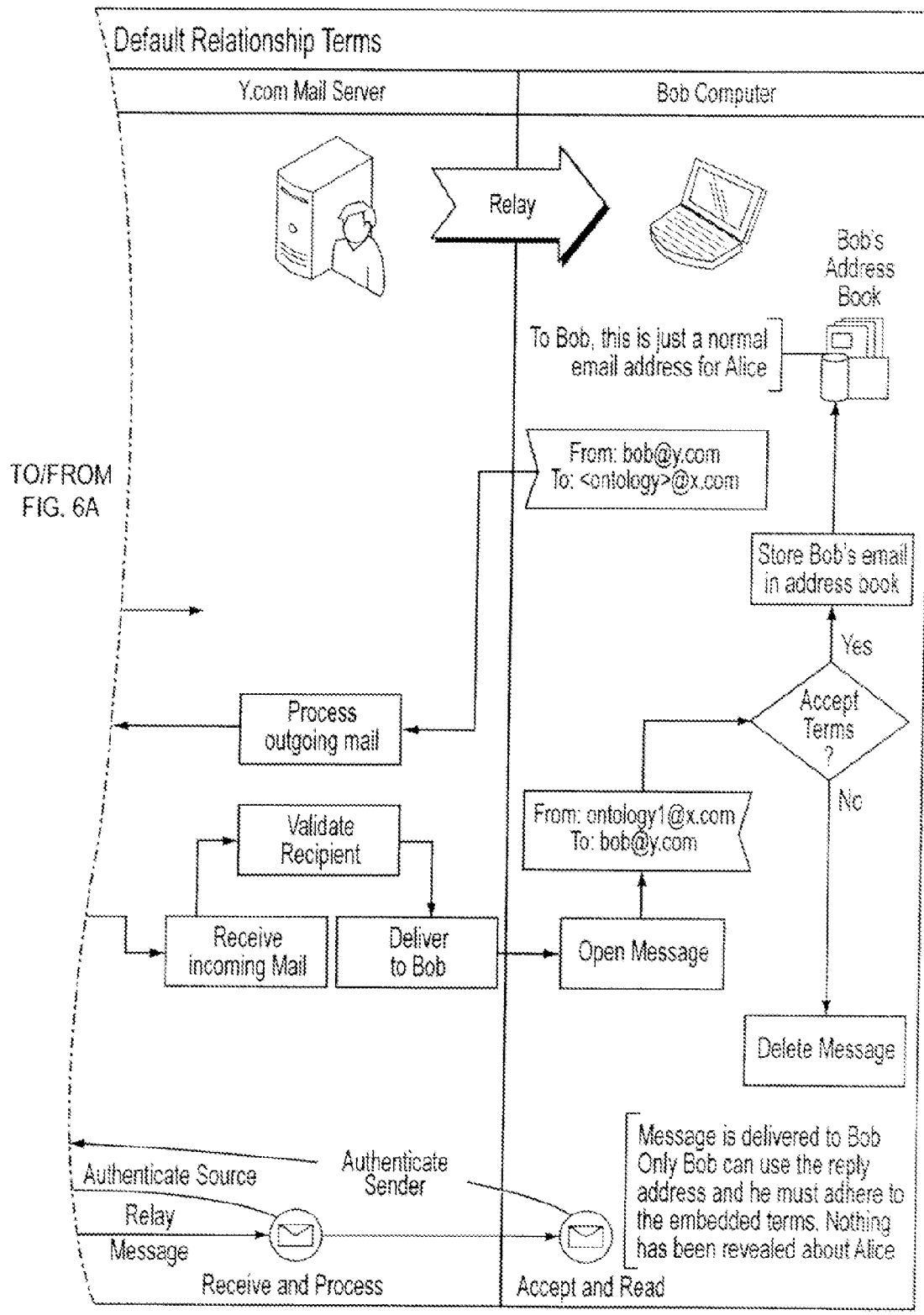
Figure 7A:
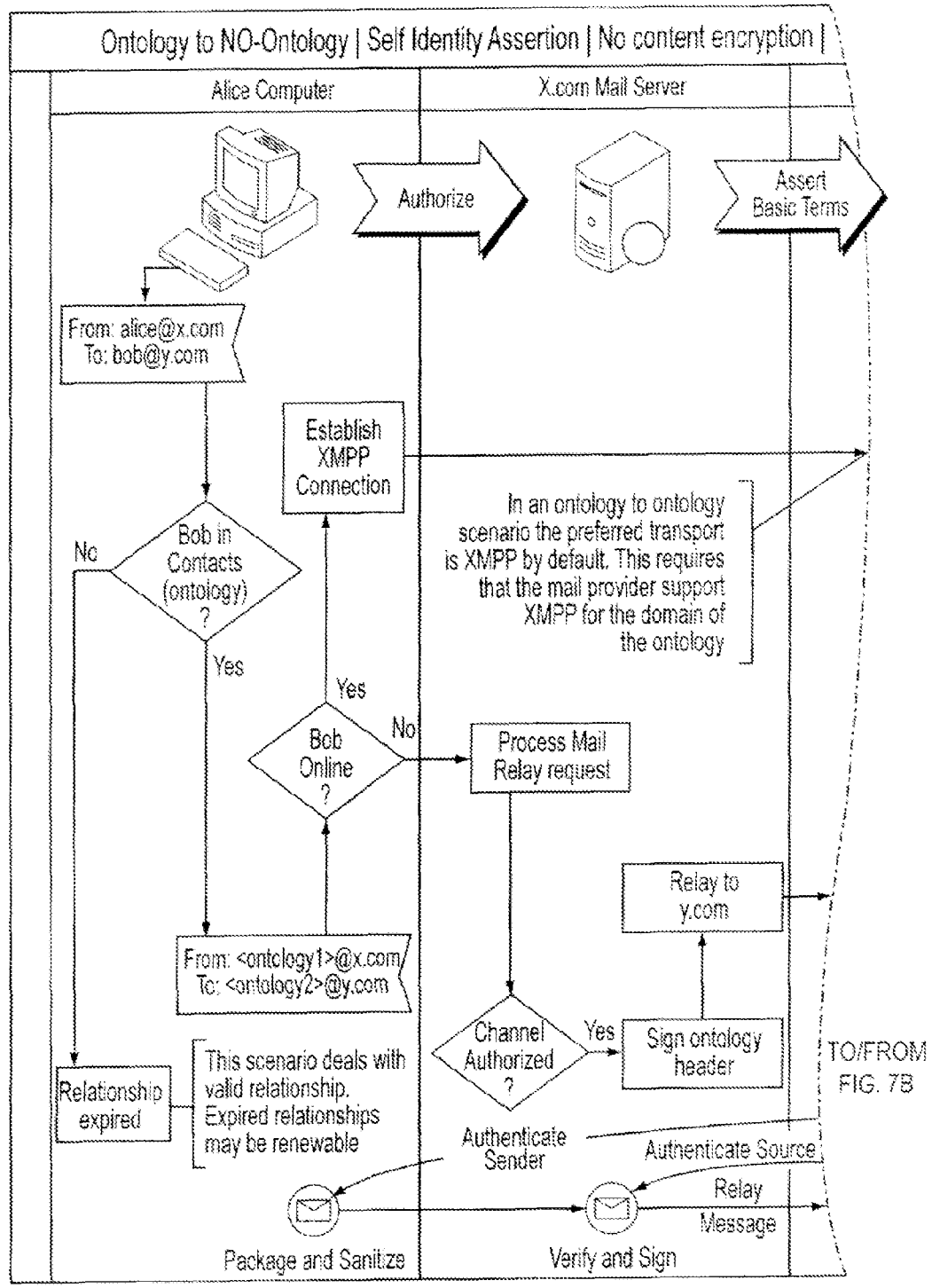
Figure 7B:
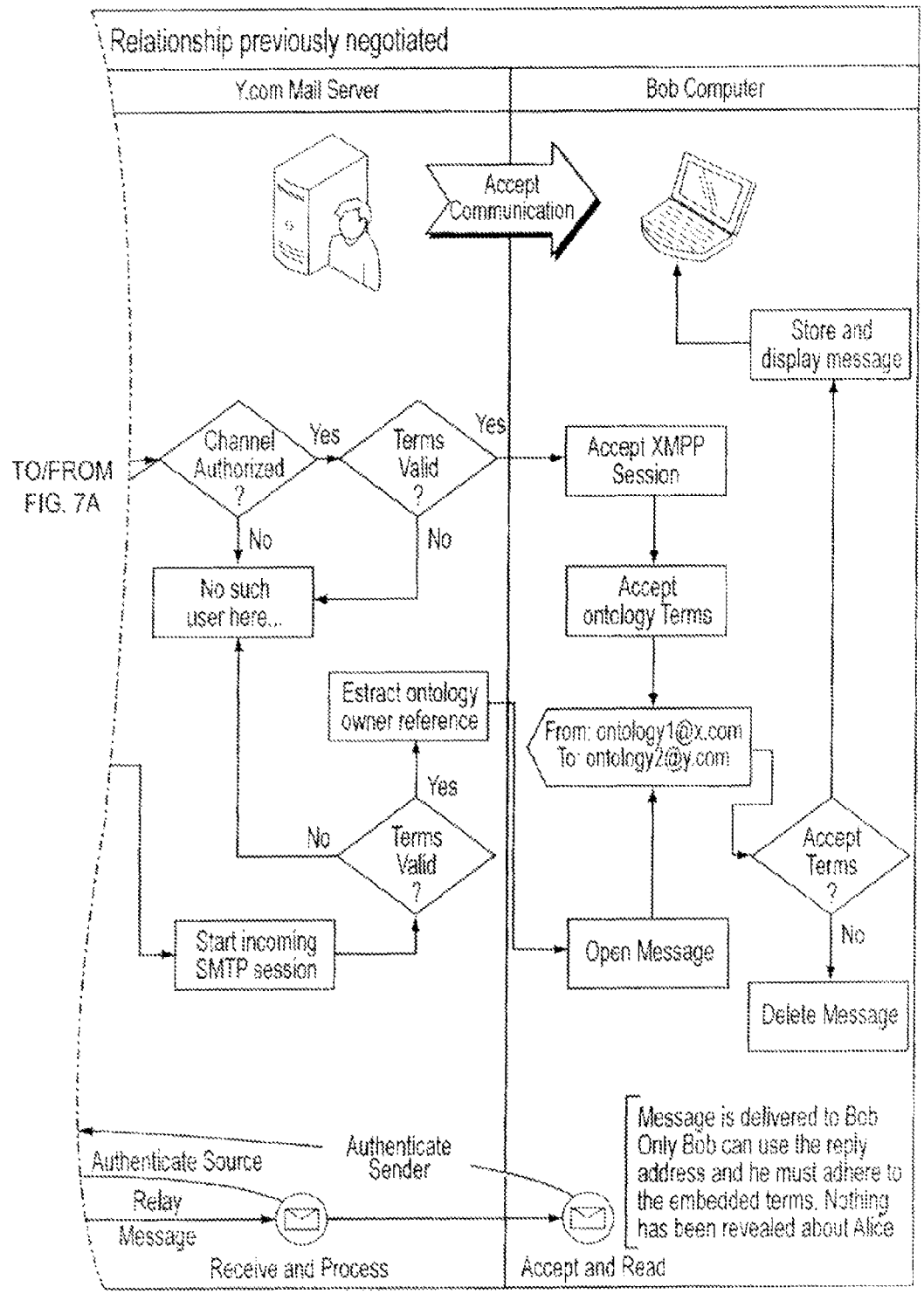
Figure 8A:
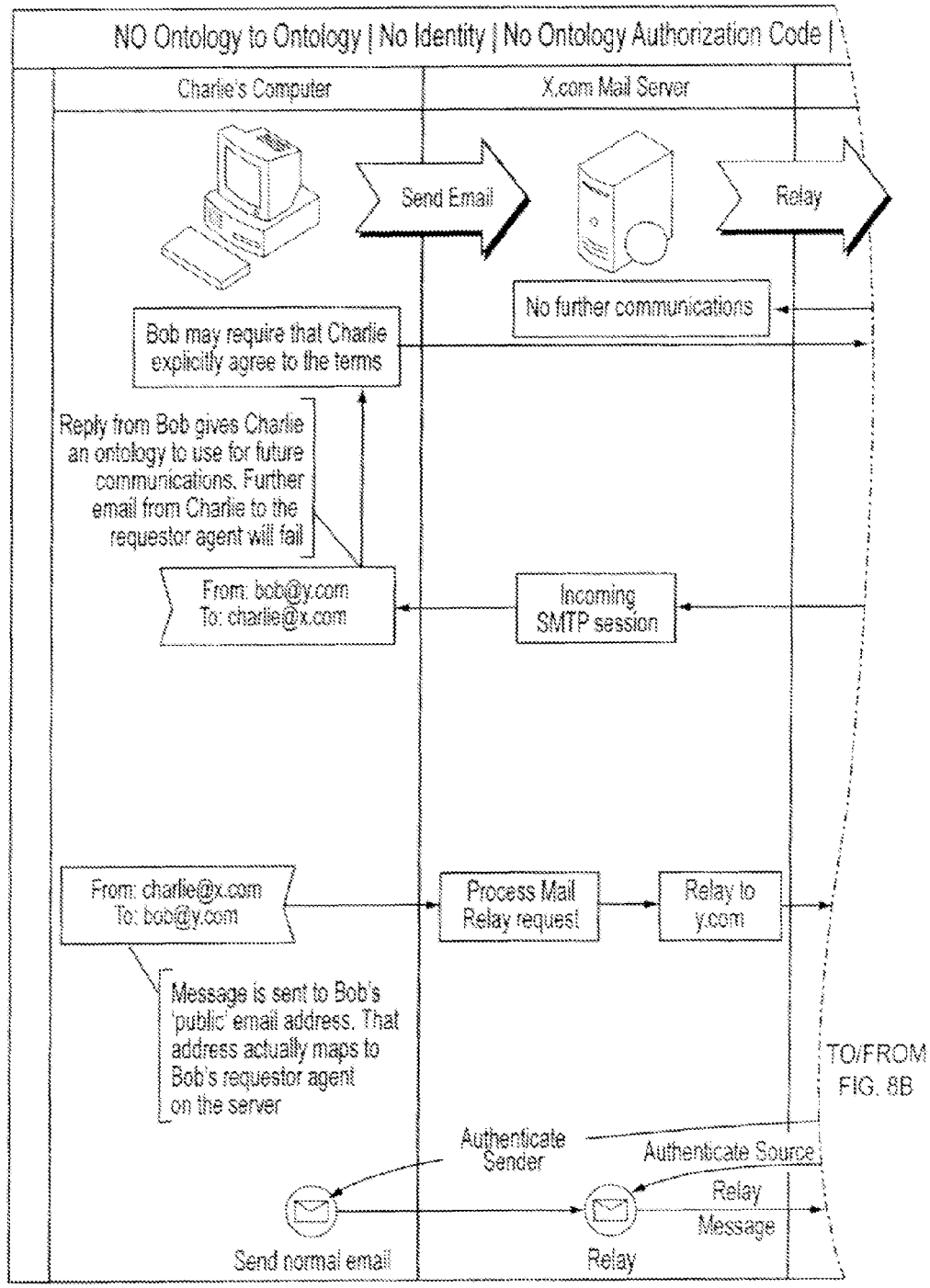
Figure 8B:
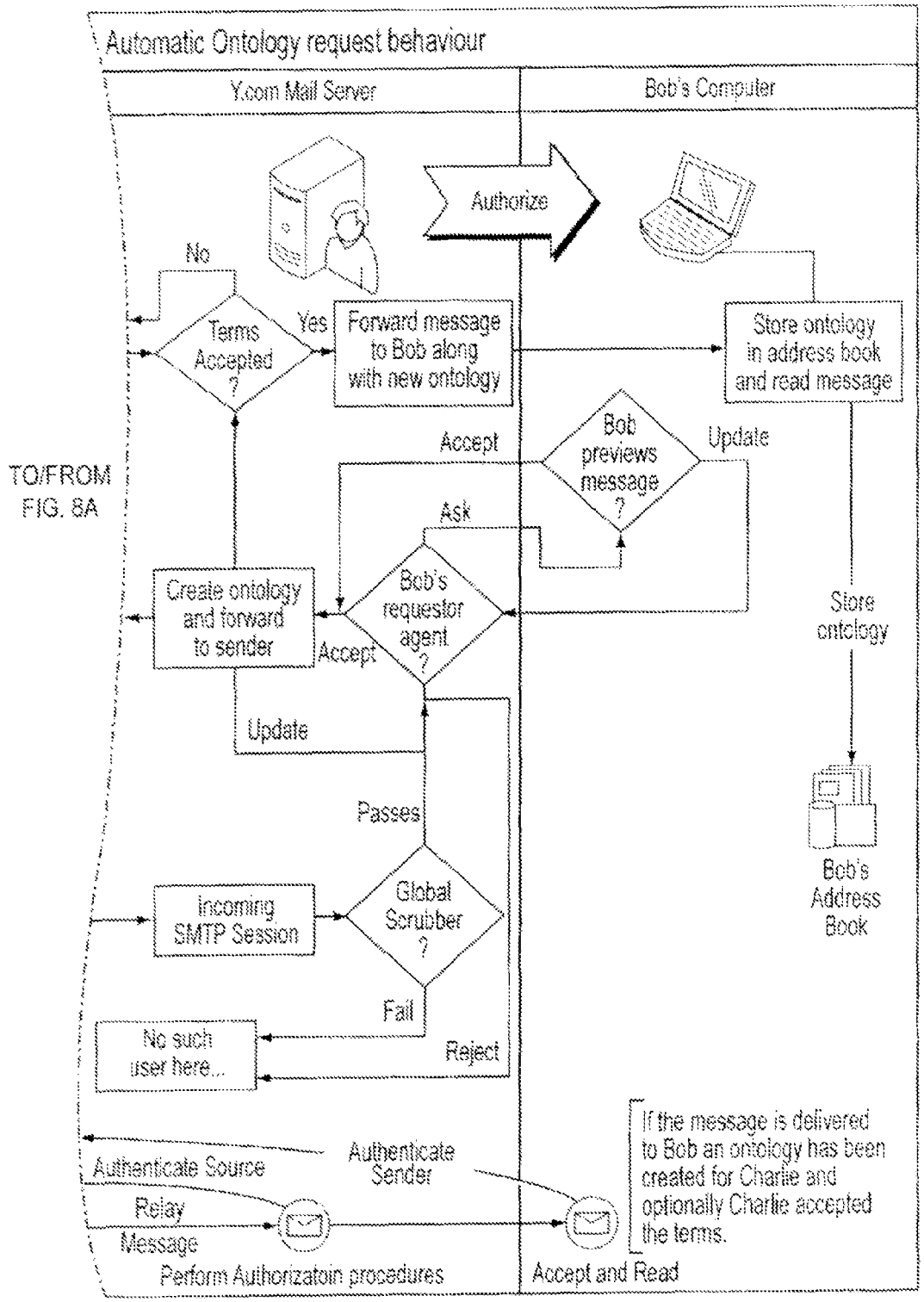
Figure 9A:
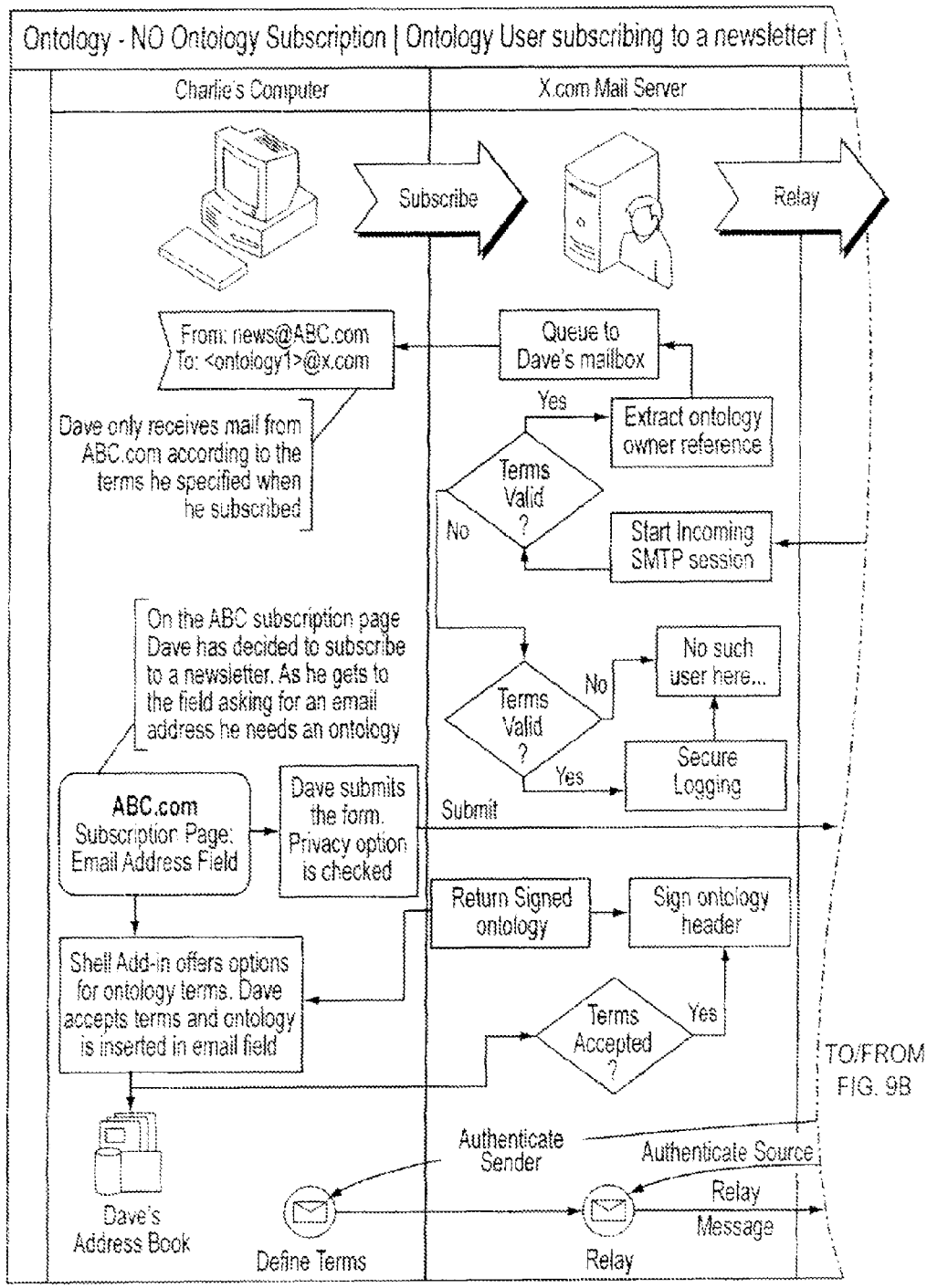
Figure 9B:
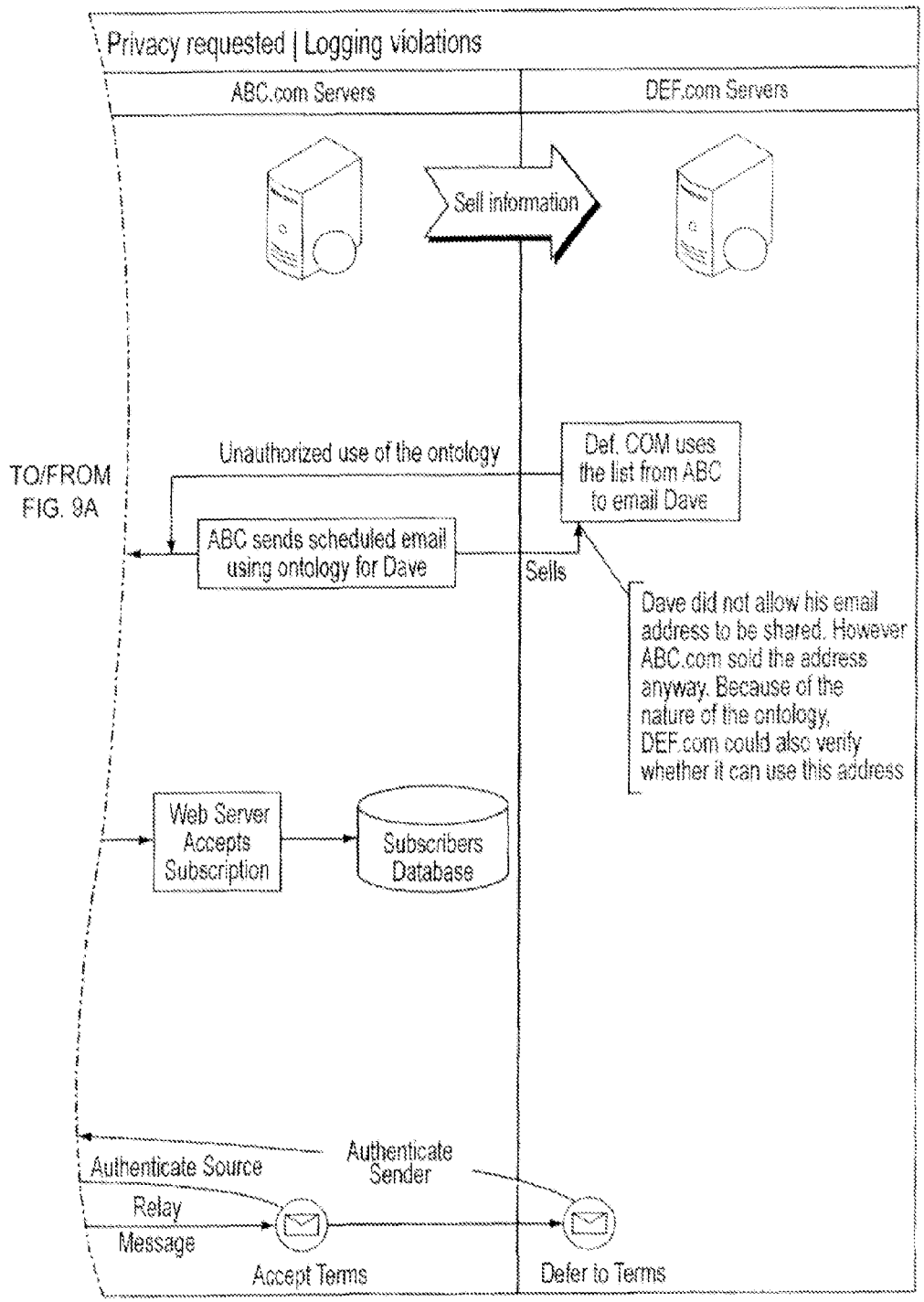
Figure 10A:
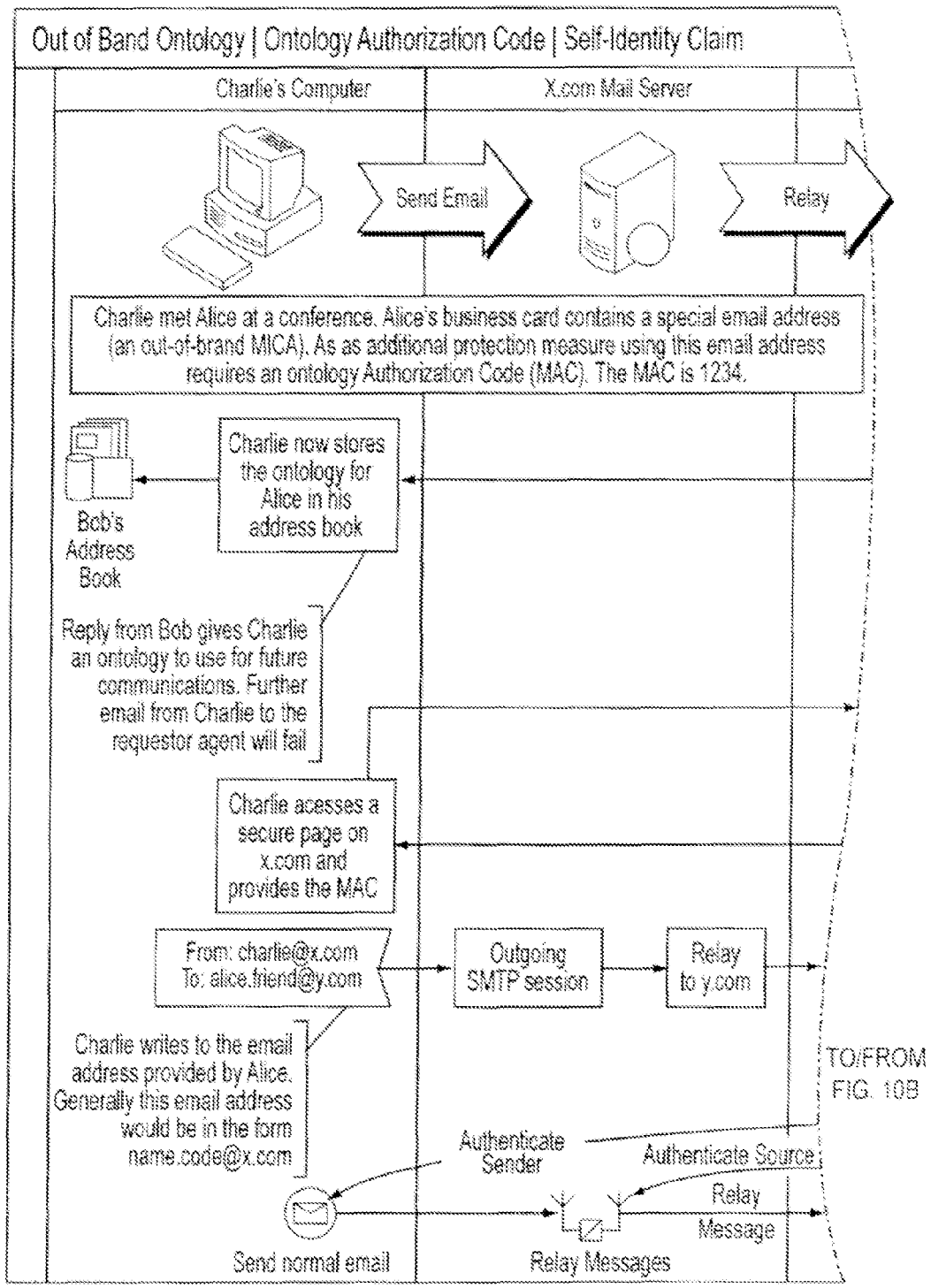
Figure 10B:
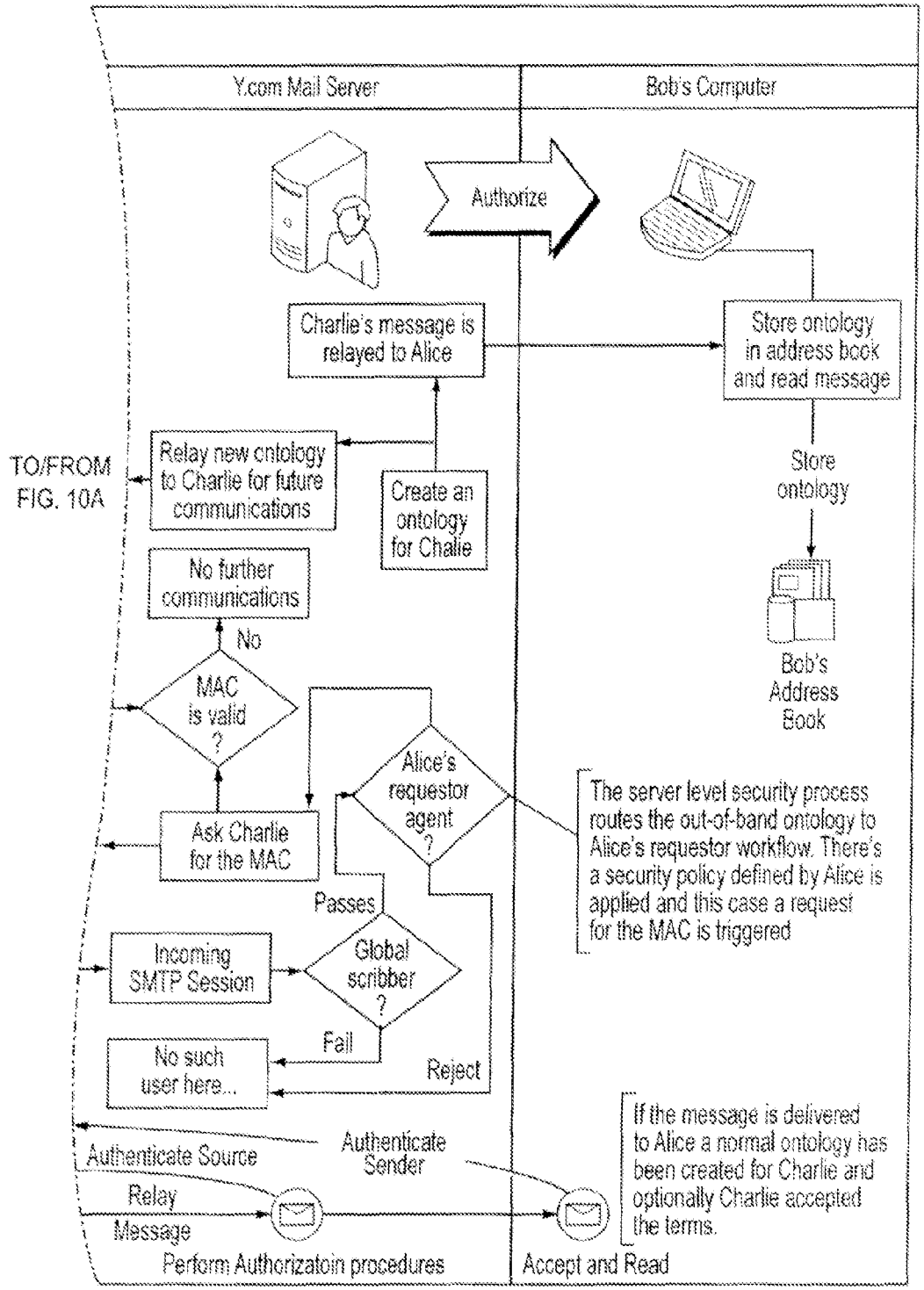
Figure 11A:
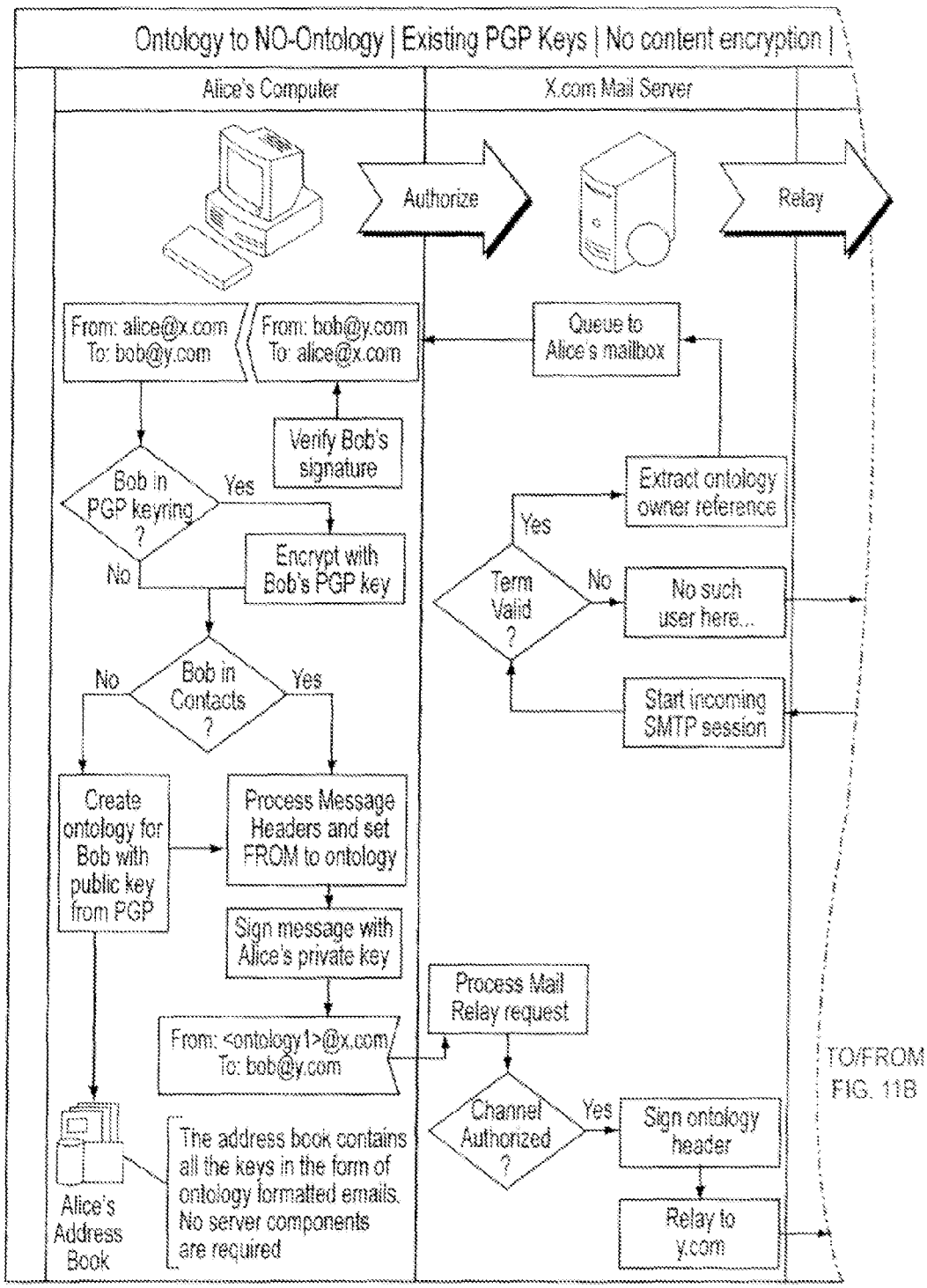
Figure 11B:
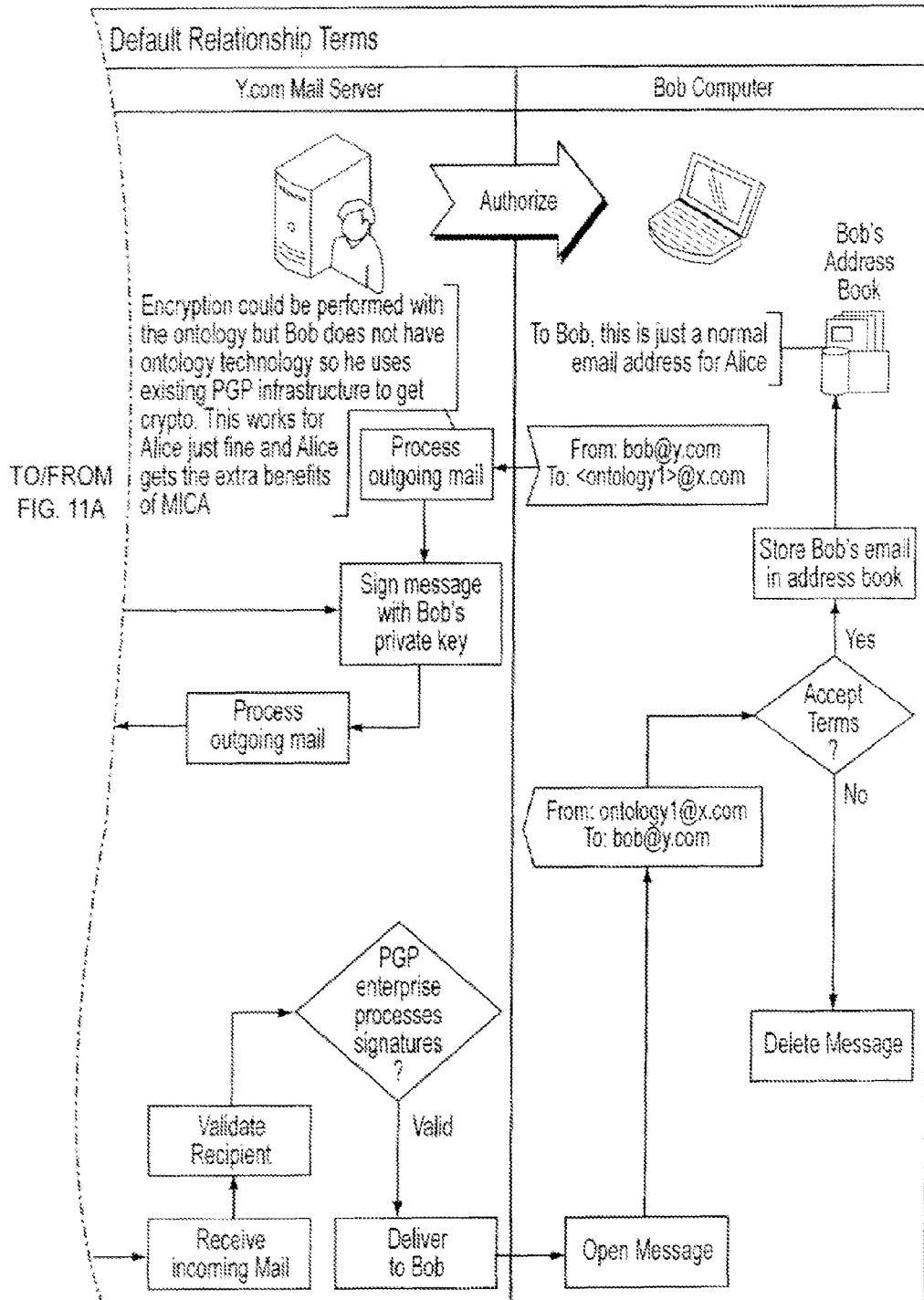

FIG. 4 is a schematic diagram that illustrates, according to embodiment, a scenario from the health care industry where Jane is a patient at the hospital. A complex set of relationships and privacy rules are involved. Using embodiments of the present invention it is possible to handle this kind of scenario simply and efficiently while fully preserving the required level of privacy and confidentiality. For instance, Jane's doctor can access Jane's test results, but the hospital's billing department can only see the details required to produce the billing—not the actual test results. In fact, a patient record using an ontology according to embodiments of the present invention and the Open XML file format could enforce powerful security measures, such as requiring Jane's explicit permission before certain information can be accessed or shared. Automatic tracking features could also be implemented quite easily.

An object of some of the embodiments of the present invention is to make security simple. Security, privacy and access control should be as simple and natural as sending an email, reviewing a document, etc. Embodiments start with the premise that an identity is private to the parties involved in the relationship that defined it. The establishment of the identity is the result of a private, secure negotiation. Once negotiated, an ontology of the present invention can provide access to the NetRNA for the period agreed upon during the negotiation phase—there is no revocation mechanism and only the parties involved in the relationship can change the terms and authenticate each other. Embodiments of the present invention also offer an opportunity for an unprecedented level of privacy balanced with accountability for the parties involved in the relationships. Each and every relationship contains unique keys; no cross-referencing is possible between relationships. By extending an ontology to Open XML documents it becomes possible to seamlessly handle the most complex relationships, including situations involving multiple parties with complex interrelated rules.

FIGS. 5-11 disclose various steps in negotiating an ontology under various contexts.

Figure 12:
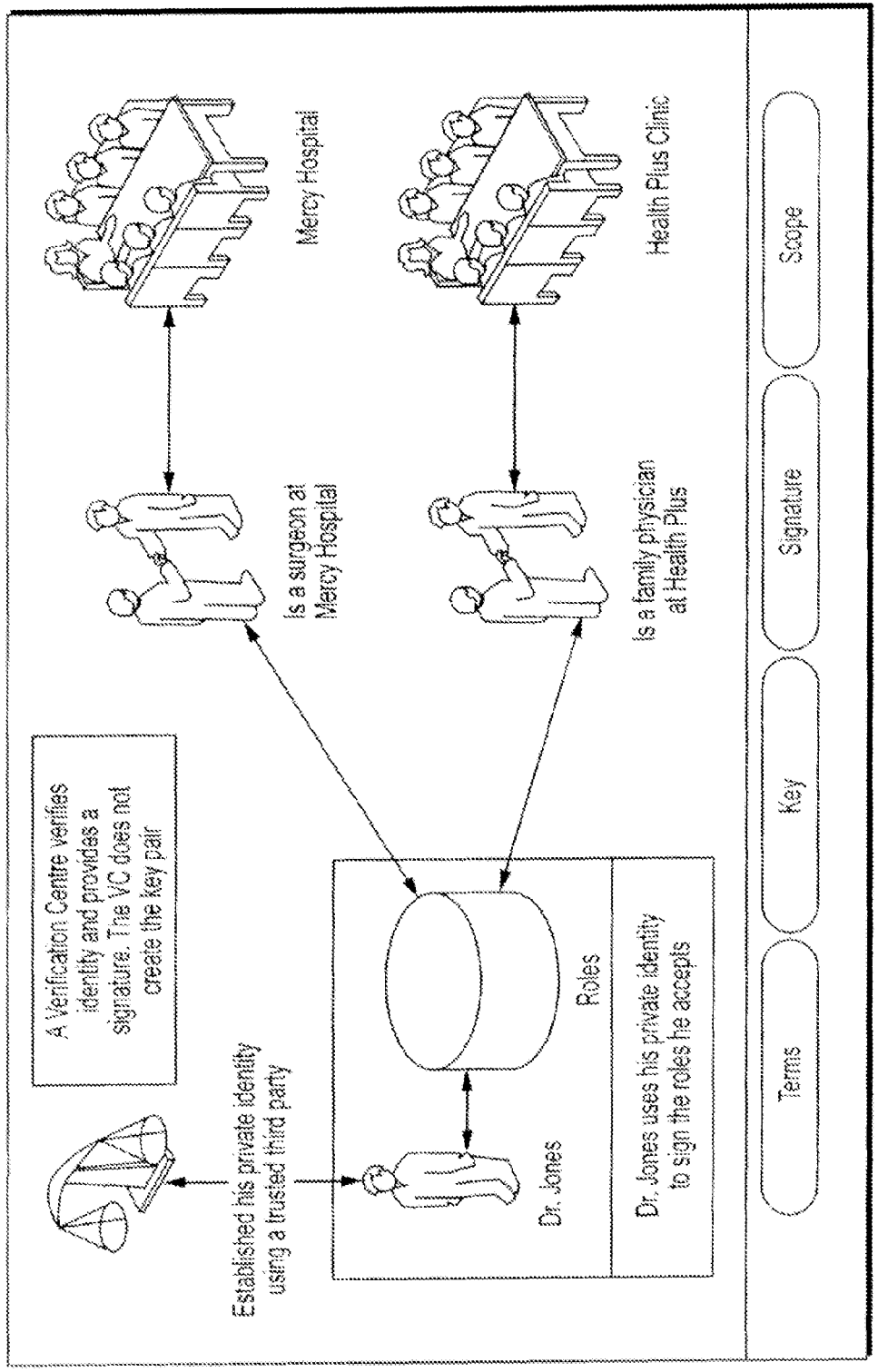
FIGS. 12 and 13 disclose examples of context sensitive relationships.
Figure 13:
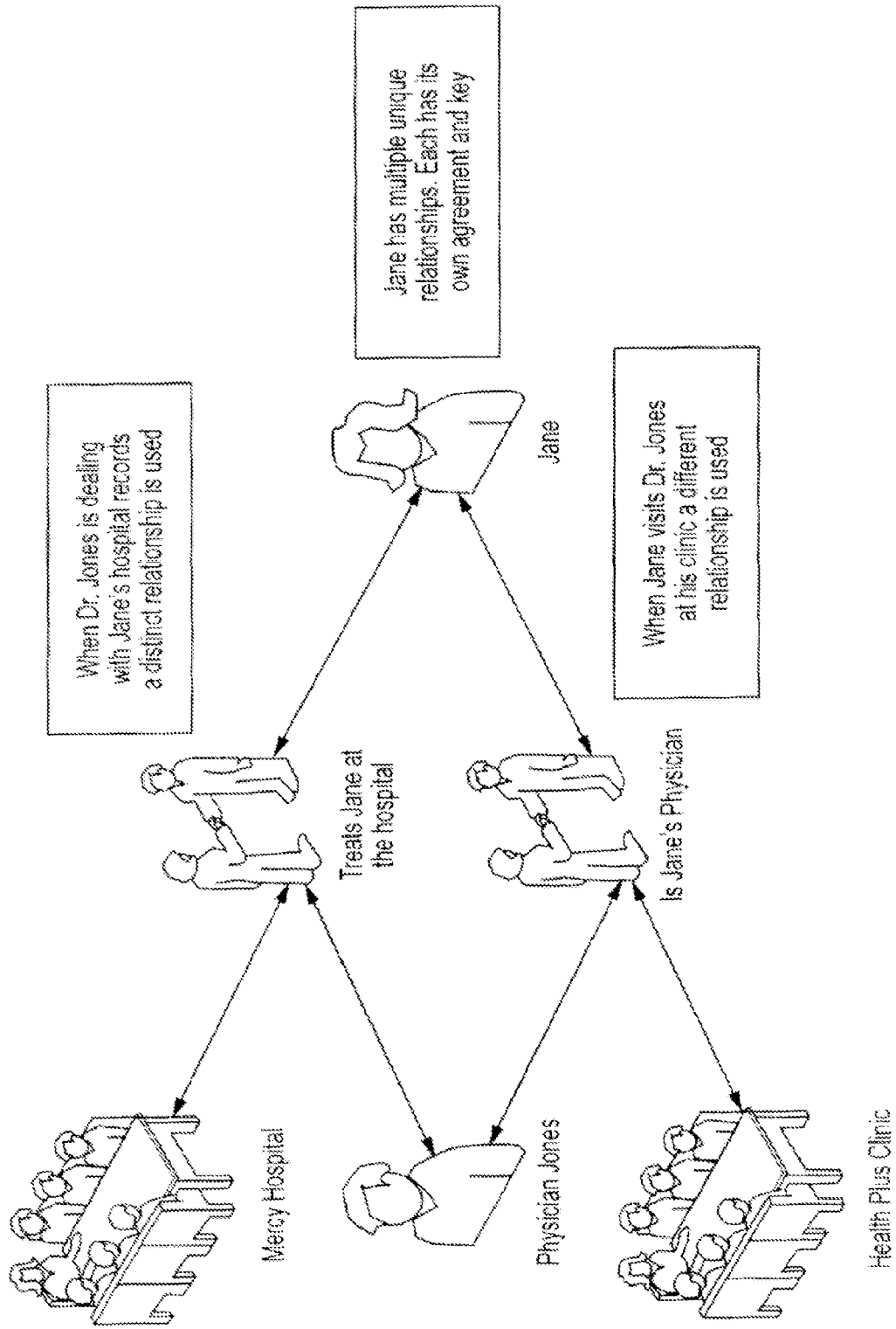

FIGS. 12 and 13 disclose examples of context sensitive relationships.

The ontology framework is facilitates the exploration and expression of collective knowledge. It encompasses a modular widget architecture and secure messaging. In the end all meaningful digital interactions involve give-and-receive actions between an individual (in a role) and one or more agents, centering on a purpose. Knowledge occurs as a result of these give-and-receive actions.

Figure 14:
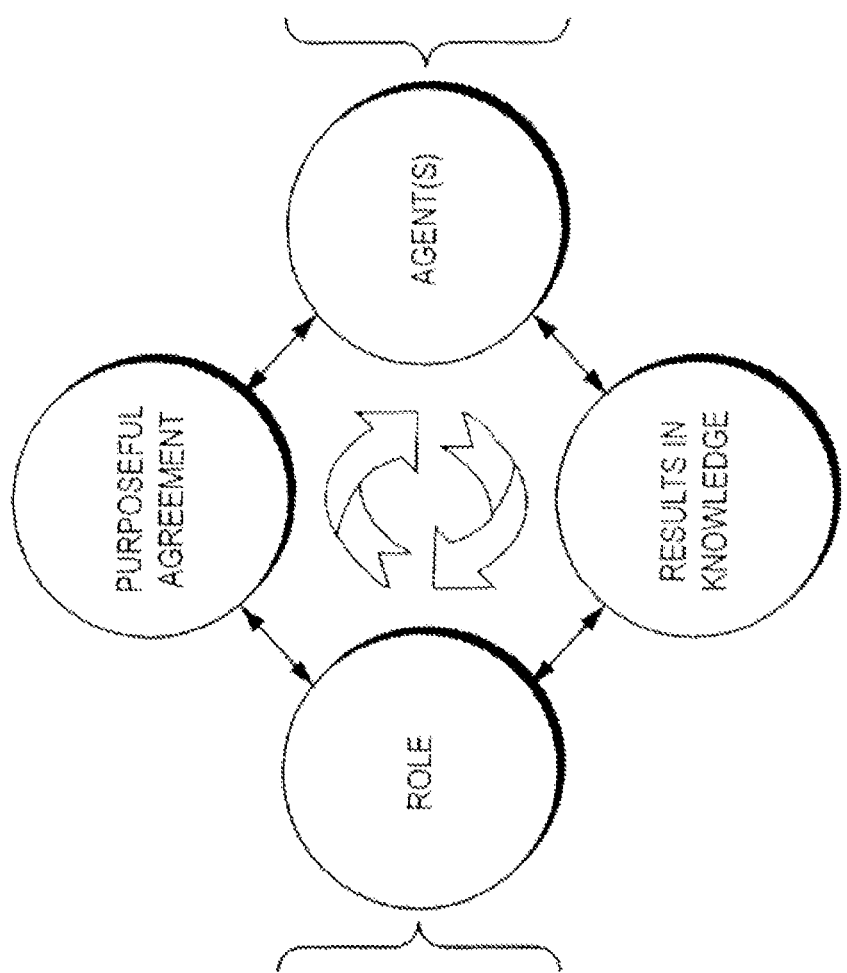
FIG. 14 is a conceptual diagram of a process according to at least one embodiment of the present invention.

Referring to FIG. 14, a conceptual diagram of the process is shown. The implementation of an agreement to facilitate a particular set of interaction as illustrated above is embodied via a Relational Nexus Agent (RNA).

The ontology architecture is fundamentally a distributed network designed to facilitate the instantiation and management of Relational Nexus Agents (RNA) to weave a rich global collective knowledge mesh through the interconnection of purpose-driven pursuits.

The resulting collective knowledge can be formalized in the form of ontologies. Ontologies codify knowledge by formalizing the concepts and relationships that can exist for an agent or a community of agents.

Figure 15:
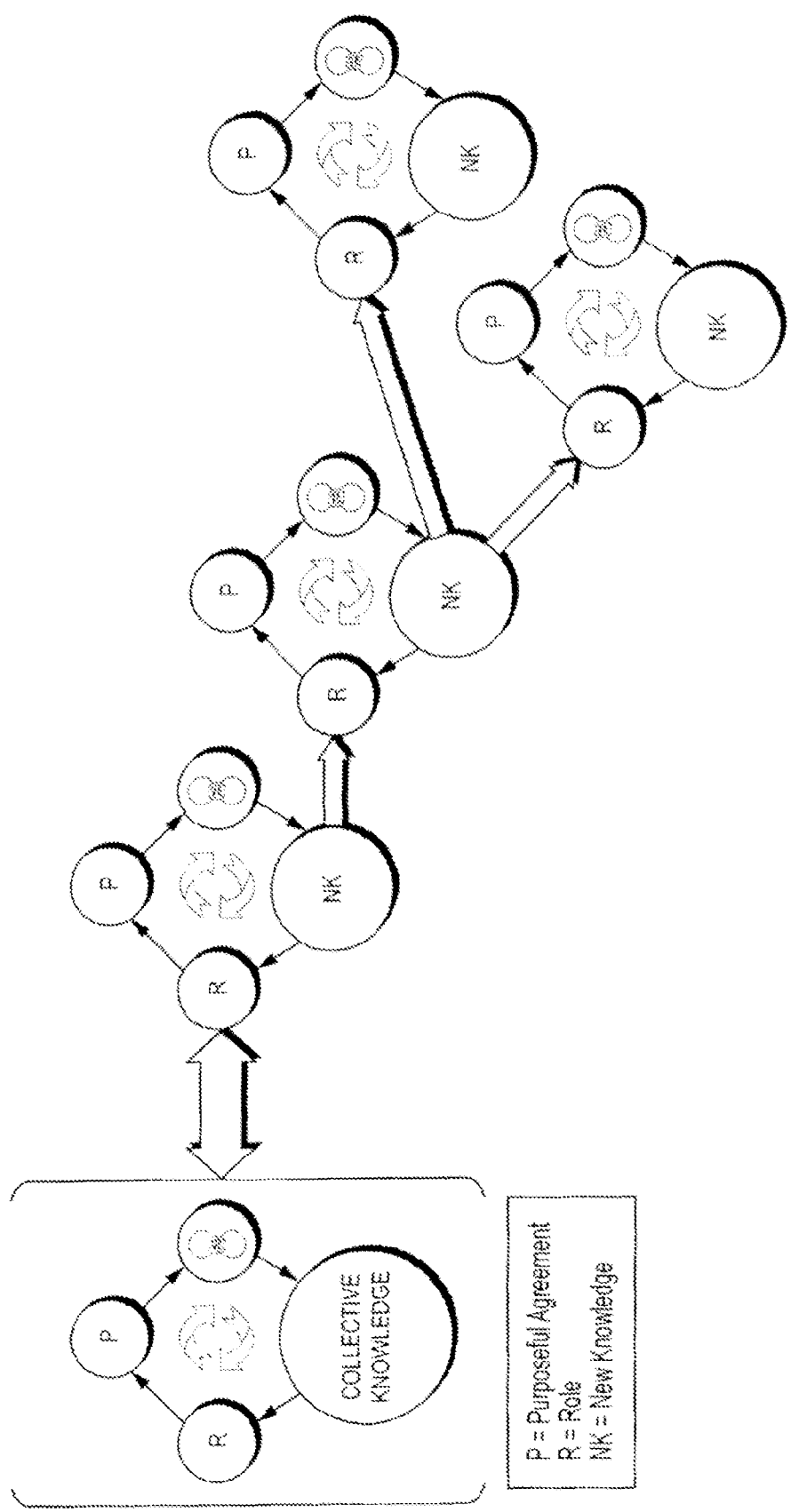
FIG. 15 is a schematic diagram of a negotiated traversal path (arrows) through a mesh of Relation Nexus Agents (RNAs).

When RNA create interconnections based on negotiated purposes a dynamic mesh emerges where collective knowledge is expressed in the form of purpose driven vectors rather than traditional data extraction. This is illustrated in FIG. 15, which shows a negotiated traversal path (arrows) through a mesh of Relational Nexus Agents (RNA). An ontology is purpose-driven path to knowledge where all participants are in active collaboration.

In practice that means a global mesh network of software agents capable of communicating and participating securely in the collective development of knowledge. Each agent is accessed for an agreed Purpose by one or more subjects acting in a Role.

The ontology SDK provides the basic constructs for deploying mesh networks of Relation Nexus Agents and the necessary secure communications infrastructure to allow ontologies to be negotiated and managed over a global RNA mesh.

The rest of this document focuses on the specific capabilities offered by the ontology SDK (secure digital key) that enable the concepts described herein.

The ontology SDK has some technical features described in the following paragraphs.

Relational Keys: A fundamental building block of the security model in ontology architecture. In essence it focuses on the use Elliptic Curve Cryptography (ECC) and well proven asymmetric cryptographic techniques in combination with proprietary techniques to deliver keys that are only usable by the intended party (or parties) under agreed terms. Relational keys offer stateless verification and for most scenarios they also eliminate the need for key repudiation. Relational keys also embed some limited terms to facilitate key management.

Dynamic Digital Agreements: once a secure communication channel is established there remains the question what can be done with it along with the reality that agreements tend to evolve over time. Dynamic Digital Agreements are an electronic negotiation and enforcement framework that al lows users and systems to negotiate mutually acceptable terms and then enforce them automatically. This framework builds on Relational Keys to provide a very high level of flexibility in the types of agreements that can be defined and the agreements can evolve over time if desired.

Universal Role Architecture: The ontology architecture recognizes the reality that people tend to assume various roles. To this end the architecture is organized around a basic construct: the Role. A Role is defined as an agreement (to accept certain rights and responsibilities) that is assumed by an entity and owned by another entity. When the owner and assumer of a role are the same we have a special case of a Role that is called a Natural Identity. Ordinary roles are implemented as ontologies, but natural identities have unique design characteristics. This role architecture means that an individual (expressed through a natural identity end point) can assume multiple roles across any number of organizations.

Secure Messaging: The basic ontology architecture does not provide transport layer security features (obfuscation of source and destination addresses for instance). The primary focus is on the protection of the content of messages. The ontology SDK provides extensive support for various and type messaging security. Key secure messaging features include relation based encryption, embedded usage control, rights management, access location control, and more. There are also options for deploying ontology Secure Messaging features in the context of very high security requirements and even as part of secure routing infrastructures but these features are not included in the ontology SDK.

Cross-Organizational Workflows: Expand the reach of applications' capabilities across firewalls and partner organizations seamlessly and with complete security. The ontology SDK provides the ability create and manage workflows that operate clear across firewalls and networks—the ultimate work on a string.

Record and Instance Level Database Security—Enables applications to include data sources, systems and users data reside in both internal and external networks. Provide a high level of security and encryption down to the attribute and object level in application stores and carry the enforcement of those permissions across networks.

Stateless Licensing: Sophisticated user licensing capabilities that do not require a complex and expensive server infrastructure while allowing an almost infinite ability to define licensing terms suitable to any business deployment scenario This basic concept has a wide range of applications, ranging from person-to-person secure communications to business-to-business processes across firewalls and more. The next few sections of this document explore some common integration scenarios.

To effect results according to the present invention, there are three touchstone concepts to be followed. First, negotiated secure communication channels are established. Second, dynamic collaboration networks are established. Third, collaborative agreements are dynamically resolved.

Establishing a Secure Communication Channel

The process of establishing a secure communication channel revolves around a mutual negotiation process. In a typical example Alice wishes to establish a secure communication channel with Bob.

Alice connects to her Nexus Agent. This is a workflow agent that can reside on a local machine or be accessed remotely. Communications with the Nexus Agent are always encrypted and only Alice can use her own Nexus Agent to create new connections. The Nexus Agent handles the management of communication channels, policies, and the changing preferences of Alice. The user interface for a Nexus Agent can be a web page, but it can also be integrated seamlessly in common productivity applications such as email.

Alice decides what credentials she is willing to disclose to Bob. The credentials provided may include a secure token provided by a third part to prove their validity. Typical credentials could be an email address, a professional membership, or any other evidence that Bob will be able to verify and that Alice is willing to disclose. This credentials package will only be accessible to Bob after he satisfies the requirements Alice will establish in the next step to verify Bob's identity.

Alice now decides what credentials she will require from Bob. Alice provides her own values for the credentials that will be used. This is a set questions and answers that Bob will have to be able to answer correctly before accessing the credentials provided by Alice. At a minimum Alice must provide an address for the recipient—this is the address that will be used to send the request.

Alice proposes attributes for the communication channel. Basic attributes include expiration date, encryption requirements, whether the channel can be renewed, etc. Attributes are extensible but in a communication channel they must be expressible as absolute values and once the channel is mutually agreed they are irrevocable and immutable.

The Nexus Agent now creates a new random key pair (Ksalice and Krbob) and prepares the channel request package.

The process is repeated for every party Alice wishes to communicate with. It is possible for Alice to have multiple channels with the same recipient using different credentials since the credentials used are an integral part of the identity of each channel.

The Nexus Agent attempts to send the request. If the recipient is already using the same technology the recipient address is an Instant Messenger address for the recipient's Nexus Agent. In the case where the recipient does not have the technology the request is sent in the form of an email or instant message containing instructions and a new Nexus Agent will be instantiated automatically for the recipient. Notice here that it is possible for messages to be sent from a nexus agent without requiring the recipient to be a part of any communication channel but this is not the scenario described here.

Bob's Nexus Agent receives the request. The request is signed by the Alice's domain and can be verified publicly through a certificate authority.

Bob's personal policy is activated and processing of the request begins. In the following steps it is possible for Bob to deal with the request manually or his personal policy can contain rules that will allow the entire processing of the request to be handled automatically.

Bob examines the questions being asked by Alice. At this point Bob only knows that somebody is requesting a communication channel. If Bob is willing to go any further a key exchange occurs using the Diffie-Hellman protocol and an encryption key is exchanged for the duration of the negotiation.

If Bob decides that he is not willing to answer the questions posed by Alice he can reject the request, and optionally provide a reason back to Alice. If Bob decides to answer the questions the entire processing of the answers occurs in Bob's Nexus Agent only.

Bob answers the questions from Alice and he examines the terms proposed by Alice.

A hash of Bob's answers is created and encrypted using the negotiated key. Bob now also decided whether the proposed terms are acceptable and optionally may propose other terms. The hash (and any proposed changes to the terms) is sent back to Alice.

Alice decrypts the hash and compares it to the hash that was pre-computed when the request was created. If they match the Bob has satisfied Alice's disclosure requirement. If they do not match the negotiation fails.

If Bob proposed alternate terms Alice can accept them, reject them, and make an alternate proposal. If an alternate proposal is made it is sent back to Bob for acceptance and the terms negotiation continues until both parties agree or either party terminates the negotiation.

If the negotiation succeeds Alice sends Krbob to Bob.

Bob receives Krbob and he creates his own new key pair (Ksbob, Kralice). He then sends Kralice to Alice.

Alice and Bob have now exchanged 2 pairs of keys that together serve as the basis for a bi-directional secure communication channel.

Establishing Secure Communication Networks

Once a network of secure communication channels exists the next logical step is to be able to take advantage of these channels to create dynamic collaboration networks. For example let us look at the following collaborative network:

Angela wants to schedule an appointment with Doctor Blanchard, who is a specialist in chronic diseases. Angela's insurance coverage (Health Plus) stipulates that appointments with a specialist must come through referrals from her primary care physician (PCP), Doctor Jones. Angela's policy also stipulates that the PCP can only make referrals to specialists that are approved by the insurance provider.

In this example we assume that all parties have an established Nexus Agent and that communication channels are successfully negotiated as needed.

At the start of the process the following connections are in place:

Angela patient of—Doctor Jones
Angela—member of—Health Plus
Doctor Jones—physician in the network of—Health Plus
Doctor Blanchard—specialist in the network of—Health Plus Here is how a dynamic collaboration agreement might unfold in this context (in this scenario a Nexus Agent is the online avatar for its owner and in most cases where a person is mentioned one can assume that this is the Nexus Agent taking action based on direct action from the owner or scripted permissions embedded in the Nexus Agent):

1. Angela asks Doctor Jones for a referral. This process occurs as simply as sending an email that is automatically routed by Angela's Nexus Agent to Doctor Jones. Since Angela is a patient there is an existing policy in place describing what Angela can do when communicating with Doctor Jones. In this example when Angela sends her email the message is automatically authenticated as coming from Angela in the appropriate policy is automatically invoked.

2. Once the message is received by Doctor Jones's Nexus Agent and Angela's right to communicate has been established the actual request in the message is processed. In this case the likely process might involve Jane, Doctor Jones's assistant viewing the message. Jane has been granted access to Doctor Jones Nexus Agent and she can access a limited portion of Angela's medical record. This allows Jane to see that Doctor Jones had already made a note about referring Angela to a specialist.

3. Jane now needs to find a specialist who is available and satisfies the terms of Angela's policy with Health Plus. At this point Doctor Jones requests permission from Angela to access her policy with Health Plus.

4. Once permission has been granted Doctor Jones communicates with Health Plus to request a list of available specialists based on Angela's medical needs and her policy.

5. Health Plus receives the request and creates a list of potential specialists. Before return the list to Doctor Jones Health Plus requests permission from each specialist. Only the specialists who have responded as being available will be returned to Doctor Jones.

6. Through Doctor Jones' Nexus Agent Jane now has a list of specialists that are available and willing to see Angela. During this exchange additional information such as possible appointment times may also be exchanged.

7. Jane can now either select a specific specialist or return a list to Angela.

8. Angela receives the referral and chooses Doctor Blanchard. A new communication channel is negotiated between Angela and Doctor Blanchard and Doctor Jones is notified of the choice.

9. Angela can now communicate with Doctor Blanchard and schedule the appointment. In the process of scheduling the appointment Angela's medical record (including contact information) is automatically provided to Doctor Blanchard.

10. Since Angela's PCP is Doctor Jones a new multi-party policy is negotiated and put in place so that Doctor Jones can provide the follow-up treatment for Angela after her visit with Doctor Blanchard. The new policy is NOT a new communication channel. Rather, it is a distributed workflow process that is linked to multiple communication channels but has its own underlying rules that extend the channels it utilizes.

Notice that communication channels are foundational to the ability to deploy and negotiate collaboration agreements. Collaboration agreements are rich workflow scripts that are negotiated between the parties and run on the context of each participant's Nexus Agents.

Unlike communication channels, collaboration agreements do change and evolve over time. Collaboration agreements are intended to evolve and change over time as the purpose they serve evolves and possibly ends.

Dynamically Resolving Collaborative Agreements

Communication Channels are secure pipes that serve as conduits for a number of collaborations over a period of time. Communication Channels are purposefully immutable and their attributes cannot change for the life of the channel.

On the other hand collaborative agreements are inherently dynamic in nature. They represent purpose and must be able to deal with changes over time.

For instance Alice has a communication channel with Bob that is based on a professional relationship. The channel itself is simply the possibility for collaboration—it is a potential vector of collaboration. When Alice wants to request a quote from Bob she creates a collaboration agreement that contains the request and all the relevant data. The communication channel is used to exchange the request, but the implementation of the quote process in contained in the collaboration agreement.

But what happens after Alice has sent here request for a quote to Bob, Charlie, and Dave? Perhaps Dave turns out to have made the best offer and the original request needs to end for Bob and Charlie while it becomes a purchase order for Dave. Here are the basic steps involved in the dynamic evolution of agreements:

1. Alice released a request for quote (RFQ) to Bob, Charlie, and Dave. Alice has the original version and each copy that was released has the ability to communicate with the original agreement periodically.

2. After 30 days Alice has received the quotes and she determines that Dave has the best quote.

3. Alice now uses her RFQ and activates the approval process that is part of the agreement, specifying Dave as the winner. This triggers the RFQ to send a message to all other instances.

4. The RFQ for Bob and Charlie receive the message, and as a result the RFQ terminates and further communication on this RFQ ends (or possibly there could be an alternate feedback process that goes into effect)

5. The RFQ for Dave receives the success notice and triggers Dave to accept the order and request a Purchase Order.

6. Once Alice received the acceptance from Dave a new agreement containing the purchase order is prepared and sent to Dave.

7. Dave receives the purchase order, inspects the terms, and upon approval the purchase order goes into effect. The original RFQ is now closed but its data it an integral part of the purchase order.

There are lot variations on this particular theme of course. The above example only illustrates a simple relatively one-sided evolution. Since agreements are implemented as rich workflows it is entirely possible to implement complex rules that involve multiple parties.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method for managing digital interactions comprising:
   creating a unique secure communication channel between a requester and a recipient via a process comprising:
   creating a primary role for the requester at a Relationship Nexus Agent, resident on a computer, the primary role being a natural identity for the requester, the natural identity including a plurality of credentials;
   enabling the requester, via a Relationship Nexus Agent, resident on a computer, to assume a plurality of secondary roles, each one of the plurality of secondary roles being a secondary identity and being based on an agreement owned by another;
   each secondary identity being formed via the process comprising:
   allowing the requester, via a Relationship Nexus Agent, resident on a computer, to chose a subset of the plurality of credentials to disclose to the recipient;
   establishing, via a Relationship Nexus Agent, resident on a computer, a set of proposed attributes for the communication channel;
   creating, via a Relationship Nexus Agent, resident on a computer, a request package including a first set of secure digital keys, the set of proposed attributes for the communication channel, and the subset of the plurality of credentials;
   communicating, via a Relationship Nexus Agent, resident on a computer, with the recipient's Relationship Nexus Agent, also resident on a computer, and forwarding the request package to the recipient;
   creating, via the recipient's Relationship Nexus Agent, a response package including a second set of secure digital keys and acceptance of the set of the proposed attributes of the communication channel;
   sending, via the recipient's Relationship Nexus Agent, the response package to the requester; and
   having the requester accept, via a Relationship Nexus Agent, resident on a computer, the response package and establishing, via the requester's Relationship Nexus Agent, a secure communication channel based on the first and second key sets and in accordance with the proposed attributes of the channel.

2. The method of claim 1, wherein the communication channel is usable over a negotiated duration as defined in the proposed attributes of the channel.

3. The method of claim 1, wherein the proposed attributes of the communication channel comprise an expiration date, the possibility of renewal of the channel, and encryption requirements.

4. The method in claim 1, wherein the subset of the plurality of credentials includes a third-party token independently verifying the natural identity of the requester.

5. The method in claim 1, wherein the recipient proposes an alternate set of proposed attributes for the relationship.

6. The method in claim 1, wherein multiple different channels are established between the requester and the recipient based on multiple different secondary roles.

7. The method in claim 1, wherein multiple different channels are established between the requester and multiple different third parties based on multiple different secondary roles.

8. The method in claim 1, wherein one or more of the Relationship Nexus Agents reside on a local computer.

9. The method in claim 1, wherein one or more of the Relationship Nexus Agents reside on a remote network appliance.

10. The method in claim 1, wherein the recipient's Relationship Nexus Agent is instantiated automatically on a computer after the request package is forwarded to the recipient.

11. The method in claim 1, wherein secure communication can flow between the requester, the recipient, and one or more third parties in a distributed secure workflow.

12. A method for managing digital interactions comprising:
   receiving a digital vector at a receiving Relationship Nexus Agent, resident on a computer, via a negotiated traversal path formed through a network of other Relationship Nexus Agents, the received digital vector being associated with a plurality of terms for a relationship between a requester endpoint and a recipient endpoint and having the property of being authenticated using secure digital keys that are usable only by the requester and the recipient under agreed terms;
   authenticating the received digital vector via the receiving Relationship Nexus Agent using the secure digital keys; and
   relaying the digital vector from the receiving Relationship Nexus Agent to a secondary role associated with the recipient;
   wherein the secure digital keys are exchanged and the agreed terms are determined via a process comprising:
   establishing the secondary role associated with the recipient via the process comprising:
   establishing an ephemeral secure channel between the requester and the recipient via a process comprising:
   creating a primary role at a requesting Relationship Nexus Agent, resident on a computer, the primary role being a natural identity for the requester, the natural identity including a plurality of credentials;
   preparing a channel request package, wherein the requester selects requester credentials to disclose, selects recipient credentials to require of the recipient, and selects proposed attributes of a channel between the requester and the recipient, wherein the requester credentials to disclose comprise a subset of the plurality of credentials of the natural identity, and wherein the requester credentials selected, the recipient credentials selected, and the proposed attributes selected are included by the requesting Relationship Nexus Agent, resident on a computer, in the channel request package;
   creating a first requester created random key pair by the requesting Relationship Nexus Agent;
   sending the channel request package from the requester by the requesting Relationship Nexus Agent;
   receiving the channel request package at the recipient by the receiving Relationship Nexus Agent;
   establishing a secure communication channel via an ephemeral key exchange; and
   establishing the agreed terms and the secure digital keys by the requesting and receiving Relationship Nexus Agents, the establishing comprising:
   reviewing, at the recipient, terms proposed by the requester; sending a response to the requester through the ephemeral secure channel by the receiving Relationship Nexus Agent, the response comprising one of an acceptance of the proposed terms and counter-proposed terms for the relationship;
   receiving, at the requester, the response from the recipient; and
   sending from the requester, through the ephemeral secure channel, one of an acceptance of the counter-proposed terms and a revised proposed terms for the relationship.

13. The method for managing digital interactions of claim 12, wherein none of the secure digital keys are contained within the digital vector.

14. The method for managing digital interactions of claim 12, wherein the relationship between the requester endpoint and the recipient endpoint provides relationship based encryption.

15. The method for managing digital interactions of claim 12, wherein the relationship between the requester endpoint and the recipient party endpoint provides embedded usage control.

16. The method for managing digital interactions of claim 12, wherein the relationship between the requester endpoint and the recipient party endpoint provides rights management.

17. The method for managing digital interactions of claim 12, wherein the relationship between the requester endpoint and the recipient party endpoint provides access location control.

18. A method for managing digital interactions comprising:
   creating a unique secure communication channel between a requester and a recipient via a process comprising:
   generating, via the requester's Relationship Nexus Agent, resident on a computer, a set of questions for the recipient that are usable to establish to the recipient's identity, a set of credentials that establish the requester's identity, and proposed terms for defining the communication channel;
   concealing, via a Relationship Nexus Agent, resident on a computer, the requester's identity by encrypting the set of credentials that establish the requester's identity;
   creating, via a Relationship Nexus Agent, resident on a computer, a request package comprising a set of secure digital keys, the set of questions for the recipient, the concealed identity of the requester, and proposed terms for defining the communication channel;
   communicating, via a Relationship Nexus Agent, resident on a computer, with the recipient's Relationship Nexus Agent, also resident on a computer, and sending the request package to the recipient's relationship nexus agent, whereby the recipient is informed that an undisclosed party is requesting a communication channel;
   creating, via the recipient's Relationship Nexus Agent, a secure connection for the recipient, using the Diffie-Helmann protocol, to allow the recipient to consider the set of questions sent by the requester;
   creating, at the recipient, a set of answers to the set of questions;
   sending, via the recipient's Relationship Nexus Agent, the set of answers to the requester's Relationship Nexus Agent;
   reviewing, at the requester, the set of answers to decide whether the answers establish the identity of the recipient;

revealing, via the recipient's Relationship Nexus Agent, the identity of the requester to the recipient once the requester is satisfied with the answers provided by the recipient;

creating, via the recipient's Relationship Nexus Agent, a response package including a second set of secure digital keys and acceptance of the set of the proposed attributes of the communication channel;

sending, via the recipient's Relationship Nexus Agent, the response package to the requester; and accepting, via the requester's Relationship Nexus Agent, the response package and establishing a secure communication channel based on the first and second key sets and in accordance with the proposed attributes of the channel.

19. The method of claim 18, wherein the communication channel is usable over a negotiated duration as defined in the proposed attributes of the channel.

20. The method of claim 18, wherein the proposed attributes of the communication channel comprise an expiration date, the possibility of renewal of the channel, and encryption requirements.

21. The method in claim 18, wherein the set of credentials that establish the requester's identity includes a third-party token for independently verifying the identity of the requester.

22. The method in claim 18, wherein the recipient proposes an alternate set of proposed attributes for the relationship.

23. The method in claim 18, wherein multiple different channels are established between the requester and the recipient.

24. The method in claim 18, wherein multiple different channels are established between the requester and multiple different third parties.

25. The method in claim 18, wherein one or more of the Relationship Nexus Agents reside on a local computer.

26. The method in claim 18, wherein one or more of the Relationship Nexus Agents reside on a remote network appliance.

27. The method in claim 18, wherein the recipient's Relationship Nexus Agent is instantiated automatically on a computer after the request package is forwarded to the recipient.

28. The method in claim 18, wherein secure communication can flow between the requester, the recipient, and one or more third parties in a distributed secure workflow.

29. A method for managing digital interactions comprising:

receiving a digital vector at a receiving Relationship Nexus Agent, resident on a computer, via a negotiated traversal path formed through a network of other Relationship Nexus Agents, the received digital vector being associated with a plurality of terms for a relationship between a requester endpoint and a recipient endpoint and having the property of being authenticated using secure digital keys that are usable only by the requester and the recipient under agreed terms;

authenticating the received digital vector via the receiving Relationship Nexus Agent using the secure digital keys; and relaying the digital vector from the receiving Relationship Nexus Agent to the recipient;

wherein the secure digital keys are exchanged and the agreed terms are determined via a process comprising:

establishing an ephemeral secure channel between the requester and the recipient via a process comprising:

preparing a channel request package, wherein the requester selects requester credentials to disclose, selects recipient credentials to require of the recipient, and selects proposed attributes of a channel between the requester and the recipient, and wherein the requester credentials selected, the recipient credentials selected, and the proposed attributes selected are included by a requesting Relationship Nexus Agent, resident on a computer, in the channel request package;

encrypting, via the requesting Relationship Nexus Agent, the requester credentials, whereby the requester credentials are concealed from the recipient;

sending the channel request package from the requester by the requesting Relationship Nexus Agent;

receiving the channel request package at the recipient by the receiving Relationship Nexus Agent;

establishing a secure communication channel and establishing the agreed terms and the secure digital keys by the requesting and receiving Relationship Nexus Agents, the establishing comprising:

reviewing, at the recipient, the recipient credentials required by the requester and sending a response including the credentials requested;

confirming, at the requester, that the response includes the credentials requested;

revealing, at the recipient, the requester credentials;

reviewing, at the recipient, terms proposed by the requester; sending a response to the requester through the ephemeral secure channel by the receiving Relationship Nexus Agent, the response comprising one of an acceptance of the proposed terms and counter-proposed terms for the relationship;

receiving, at the requester, the response from the recipient; and sending from the requester, through the ephemeral secure channel, one of an acceptance of the counter-proposed terms and a revised proposed terms for the relationship.

30. The method for managing digital interactions of claim 29, wherein none of the secure digital keys are contained within the digital vector.

31. The method for managing digital interactions of claim 29, wherein the relationship between the requester endpoint and the recipient endpoint provides relationship based encryption.

32. The method for managing digital interactions of claim 29, wherein the relationship between the requester endpoint and the recipient party endpoint provides embedded usage control.

33. The method for managing digital interactions of claim 29, wherein the relationship between the requester endpoint and the recipient party endpoint provides rights management.

34. The method for managing digital interactions of claim 29, wherein the relationship between the requester endpoint and the recipient party endpoint provides access location control.

* * * * *